US009325841B1

(12) United States Patent
Noble, Jr. et al.

(10) Patent No.: US 9,325,841 B1
(45) Date of Patent: *Apr. 26, 2016

(54) DETERMINING WHETHER THE LOCAL TIME WHERE A MOBILE DEVICE IS LOCATED IS WITHIN A CALLING WINDOW OF TIME

(71) Applicant: Noble Systems Corporation, Atlanta, GA (US)

(72) Inventors: James K. Noble, Jr., Marietta, GA (US); Jason P. Ouimette, Atlanta, GA (US); Karl H. Koster, Sandy Springs, GA (US); Christopher S. Haggerty, Atlanta, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/557,500

(22) Filed: Dec. 2, 2014

Related U.S. Application Data

(63) Continuation-in-part of application No. 13/755,015, filed on Jan. 31, 2013, now Pat. No. 8,934,870.

(51) Int. Cl.
*H04M 3/42* (2006.01)
*H04W 4/16* (2009.01)
*H04W 4/02* (2009.01)
*H04W 4/00* (2009.01)
(Continued)

(52) U.S. Cl.
CPC ...... *H04M 3/42374* (2013.01); *H04M 1/72525* (2013.01); *H04M 3/42357* (2013.01); *H04W 4/001* (2013.01); *H04W 4/02* (2013.01); *H04W 4/12* (2013.01); *H04W 4/16* (2013.01)

(58) Field of Classification Search
CPC ............... H04M 3/42374; H04M 1/72525; H04M 3/42357; H04W 4/001; H04W 4/02; H04W 4/12; H04W 4/16
USPC ............ 455/414.1, 418, 415, 435.1, 411, 419
See application file for complete search history.

(56) References Cited

U.S. PATENT DOCUMENTS 7,016,480 B1   3/2006  Saylor et al.
7,643,616 B1   1/2010  Dianda
(Continued)

OTHER PUBLICATIONS

Noble Systems Corporation, Maestro Jan. 1, 2010 User Manual, vol. 2, Aug. 3, 2010, 416 pages, Noble Systems Corporation, Atlanta GA 30319.

(Continued)

*Primary Examiner* — Mong-Thuy Tran

(57) ABSTRACT

Various embodiments of the invention provide methods, systems, and computer-program products for determining whether a local time for a first party is within a calling window of time for originating a communication by a second party to a mobile device of the first party. For particular embodiments, information about the mobile device is retrieved by a computer-program application residing on the device. Depending on the embodiment, this information may comprise contact preferences, a current time of a location where the mobile device is located, a geo-location of the device, and/or a time zone for the location where the device is located. In various embodiments, once the information has been retrieved, at least a portion of the information is sent to the second party to be used to determine whether the local time for the first party is within the calling window for originating the communication to the mobile device.

18 Claims, 16 Drawing Sheets

(51) Int. Cl.
*H04W 4/12* (2009.01)
*H04M 1/725* (2006.01)

(56) References Cited

U.S. PATENT DOCUMENTS

| | | |
|---|---|---|
| 8,358,771 B1 | 1/2013 | Moore et al. |
| 8,670,787 B1 | 3/2014 | Todd |
| 2002/0168987 A1 | 11/2002 | Wang et al. |
| 2003/0027576 A1 | 2/2003 | Fitzpatrick et al. |
| 2005/0064854 A1* | 3/2005 | Jang .................. H04M 3/42187 455/415 |
| 2005/0070282 A1* | 3/2005 | Hinz ........................ H04W 4/16 455/435.1 |
| 2005/0215242 A1 | 9/2005 | Black et al. |
| 2006/0148458 A1 | 7/2006 | Komaria et al. |
| 2006/0252438 A1 | 11/2006 | Ansamaa et al. |
| 2006/0286970 A1* | 12/2006 | Otobe et al. .................. 455/415 |
| 2007/0172050 A1 | 7/2007 | Weinstein et al. |
| 2010/0014497 A1* | 1/2010 | Aggarwal et al. ............. 370/338 |
| 2010/0157990 A1* | 6/2010 | Krzyzanowski et al. ..... 370/352 |
| 2010/0246787 A1 | 9/2010 | Ray |
| 2010/0254525 A1 | 10/2010 | Maly et al. |
| 2010/0260327 A1 | 10/2010 | Ray |
| 2010/0285780 A1 | 11/2010 | Collins |
| 2011/0116618 A1 | 5/2011 | Zyarko et al. |
| 2011/0237233 A1 | 9/2011 | Couse |
| 2011/0250902 A1 | 10/2011 | Huang et al. |
| 2012/0257738 A1 | 10/2012 | Mateos Perez et al. |
| 2013/0036184 A1 | 2/2013 | Hung et al. |
| 2013/0053027 A1 | 2/2013 | Lau et al. |
| 2013/0109361 A1* | 5/2013 | Felt ............................ 455/414.1 |
| 2013/0203439 A1 | 8/2013 | Lifshitz et al. |
| 2014/0185609 A1* | 7/2014 | Efrati et al. ................... 370/352 |

OTHER PUBLICATIONS

Noble Systems Corporation, Maestro Jan. 1, 2010 User Manual, vol. 1, Aug. 17, 2010, 454 pages, Noble Systems Corporation, Atlanta, GA.

Nobles Systems Corporation, Maestro Apr. 1, 2010 User Manual, vol. 1, Jan. 11, 2012, 486 pages, Noble Systems Corporation, Atlanta, GA 30319.

Nobles Systems Corporation, Maestro Apr. 1, 2010 User Manual, vol. 2, Jul. 19, 2011, 422 pages, Noble Systems Corporation, Atlanta, GA 30319.

Office Action Received for U.S. Appl. No. 13/467,101, Dated Jun. 6, 2013.

Notice of Allowance Received for U.S. Appl. No. 13/467,101, dated Dec. 16, 2013.

Office Action Received for U.S. Appl. 13/467,101, dated Oct. 11, 2013.

Office Action Received for U.S. Appl. No. 14/529,220 dated Nov. 25, 2015.

Office Action Received for U.S. Appl. No. 14/194,941 dated Oct. 13, 2015.

Office Action Received for U.S. Appl. No. 13/719,879 dated Jan. 22, 2015.

Notice of Allowance Received for U.S. Appl. No. 13/719,879 dated Jul. 7, 2015.

Office Action Received for U.S. Appl. No. 13/719,879 dated Jun. 5, 2015.

\* cited by examiner

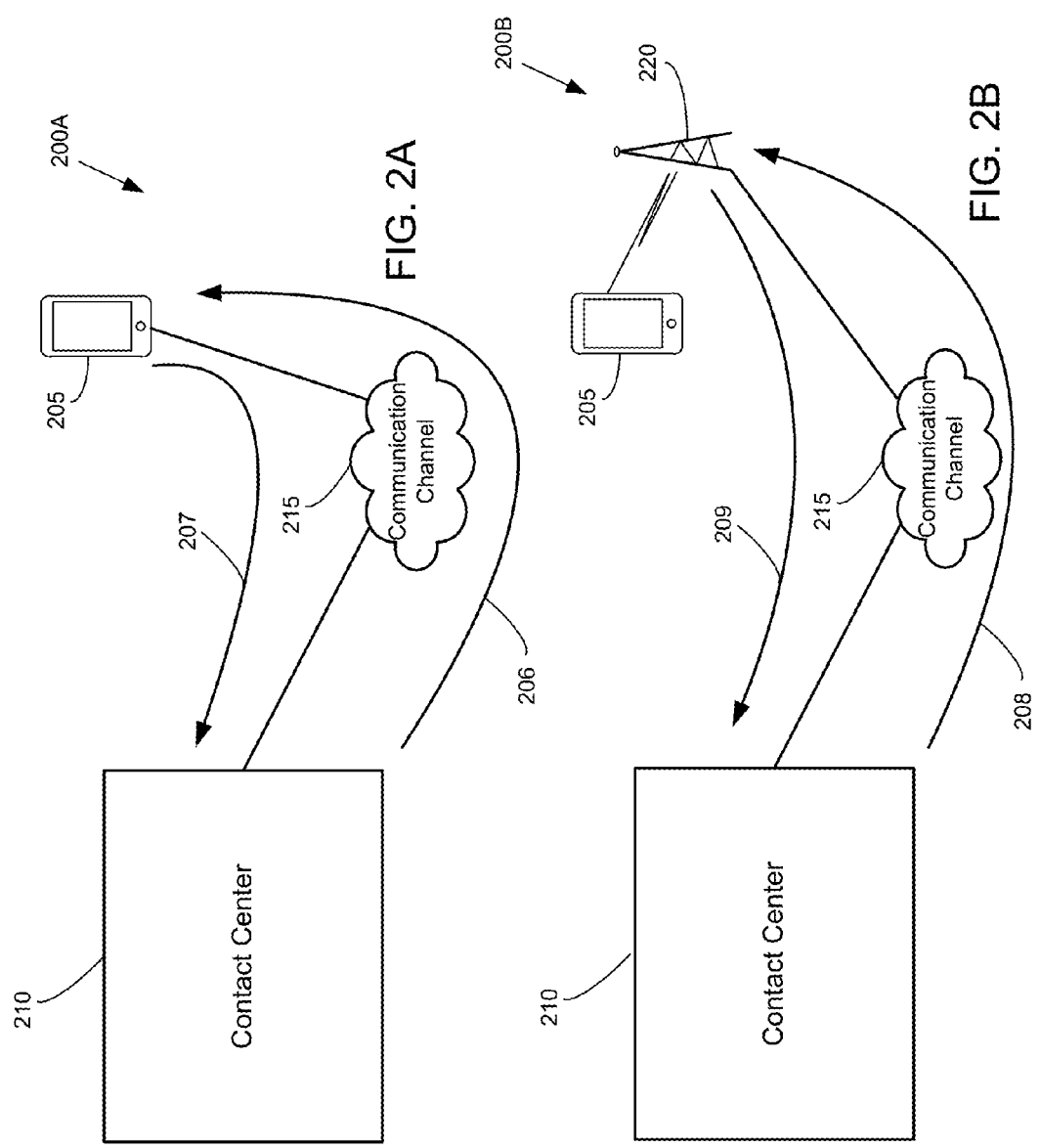

DETERMINING WHETHER THE LOCAL TIME WHERE A MOBILE DEVICE IS LOCATED IS WITHIN A CALLING WINDOW OF TIME

CROSS REFERENCE TO RELATED APPLICATIONS

This application is a continuation-in-part of U.S. patent application Ser. No. 13/755,015, entitled Determining Whether the Local Time for a Location Where a Mobile Device is Located is Within a Calling Window of Time and filed on Jan. 31, 2013, for which the entire contents are incorporated by reference for all that they teach.

BACKGROUND

Outbound contact centers may originate telephone calls to targeted parties for various purposes. The calls may be made in conjunction with surveying individuals for a political campaign, notifying customers of suspicious charges on their credit card accounts, inquiring about repayments of past due loan amounts, soliciting donations for a non-profit organization, or offering new products for sale. In many instances, the contact center may originate calls to individuals ("targeted parties") located in a variety of geographical areas. Frequently, the targeted party may be in another state than the state in which a contact center is located. Thus, the contact center may originate calls to targeted parties that are hundreds, or even thousands, of miles away from the contact center. Consequently, the contact center is often in a different time zone than that of the targeted party.

With that said, various regulations may limit the times when certain types of calls may be attempted to the targeted party. For example, certain federal regulations may limit the origination of telemarketing calls to between 8:00 a.m. and 9:00 p.m. The time period in which calls are allowed to be placed is sometimes referred to as the "calling window." In some instances, contact centers may define and use more restrictive calling windows. While in some instances, some states may have more restrictive calling windows than federal calling windows, including with respect to certain days.

Typically, a calling window is defined with respect to the targeted party and not with respect to the contact center. In other words, calling window times are defined as local to the targeted party. Therefore, if both the contact center and the targeted party are located in the Eastern Time Zone, then the contact center can originate a call to this targeted party at 8:30 a.m. if the applicable calling window is 8:00 a.m. to 9:00 p.m. However, if instead the contact center is located in the Eastern Time Zone and the targeted party is located in the Pacific Time Zone, then the contact center may not originate a call at 8:30 a.m. Eastern Time to the targeted party because the local time for the targeted party is the hours earlier, i.e., 5:30 a.m. Pacific Time. Thus, the contact center must know the local time of the targeted party before placing a call to the targeted party to ensure compliance with the appropriate regulations and/or a targeted party's preferences defining the calling window. Accordingly, the contact center typically determines the time zone the targeted party is located in to arrive at the local time of the targeted party.

In many instances, determining the time zone the targeted party is located in can be determined once the location of the targeted party is known. However, determining the location of the targeted party may not always be a simple process. For instance, in some cases, the time zone of the targeted party can be determined by analyzing the targeted party's telephone number, but particular conditions may cause uncertainty. For example, the targeted party's telephone number may be to the party's mobile device. In this example, the targeted party lives in Chicago but is visiting friends in Los Angeles. Therefore, although the local time zone associated with the targeted party's telephone number for his mobile device is the Central Time Zone, the party is actually located in the Pacific Time Zone. Thus, if a contact center relies on the time zone associated with the targeted party's telephone number for his mobile device to identify the local time for the targeted party, then the contact center will be wrong. As a result, the contact center could potentially place a noncompliant telephone call to the targeted party's mobile device. It is with respect to these considerations and others that the disclosure herein is presented.

BRIEF SUMMARY

In general, embodiments of the present invention provide computer-program products, methods, systems, apparatus, and computing entities for determining whether a local time for a first party is within a calling window of time for originating a communication by a second party to a mobile device of the first party. For particular embodiments, information about the mobile device is retrieved by a computer-program application residing on the mobile device. For instance, depending on the embodiment, this information may comprise one or more of contact preferences, a current time for a location where the mobile device is located, a geo-location of the mobile device, and a time zone for the location where the mobile device is located.

Typically, in various embodiments, the computer-program application has been downloaded to the mobile device and, for particular embodiments, the process of downloading the computer-program application provides the second party with authorization to originate communications such as telephone calls and/or text messages to the mobile device. Thus, in various embodiments, once the information has been retrieved from the device, at least a portion of the retrieved information is sent to the second party. As a result, the second party may then use the information to determine whether the local time for the first party is within the calling window of time for originating a communication to the mobile device.

In particular embodiments, the computer-program application retrieves the information about the mobile device as a result of receiving a request from the second party. In addition, in particular embodiments, the computer-program application may first request permission from the first party to originate a communication to the mobile device before the application retrieves the information about the mobile device. In addition, in particular embodiments, the computer-program application may allow the first party to identify and mange preferences for being contacted. Finally, in particular embodiments, the second party may be a contact center. For example, in one particular instance, the second party may be a contact center that originates communications such as telephone calls and/or text messages on behalf of a third party that originated the computer-program application.

As is discussed in greater detail below, the subject matter disclosed herein may be implemented as a computer-controlled apparatus, a method, a computing system, or an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein:

FIGS. 2A, 2B, and 2C show architectures that may be employed to determine whether the local time for a mobile device is within a calling window in accordance with various technologies and concepts disclosed herein.

DETAILED DESCRIPTION

Figure 1:
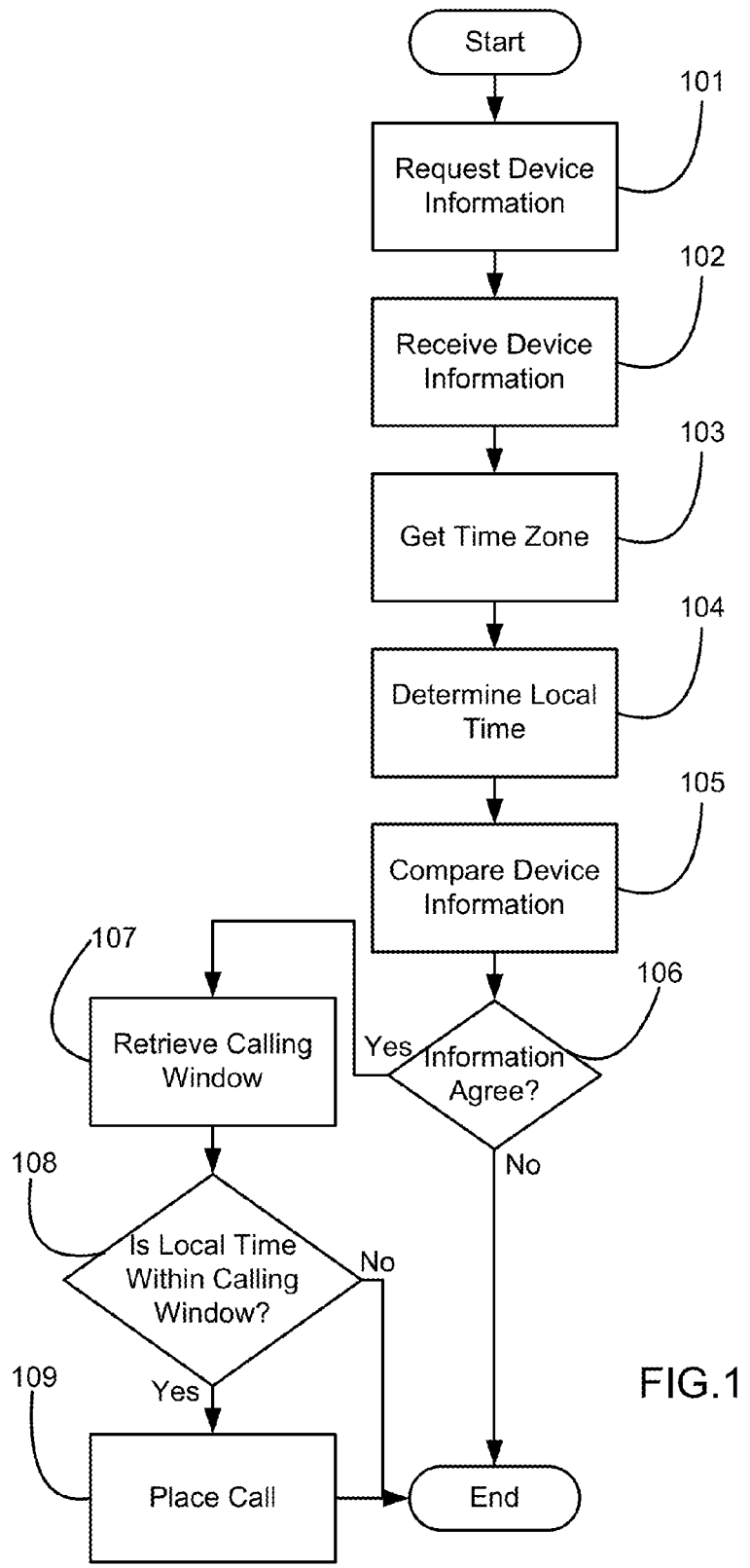
FIG. 1 illustrates an embodiment of a general process flow for practicing the various technologies and concepts disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

General Process Flow

FIG. 1 illustrates an embodiment of a process flow for determining whether to initiate communication to a targeted party's mobile device based on whether the local time where the mobile device is currently located is within an applicable calling window. However, before discussing the process flow provided in FIG. 1, a description of some general terminology is provided to help the reader with understanding the technologies and concepts described herein.

Generally, the term "calling window" refers to the time period wherein calls can be delivered to a targeted party. Such windows have been put into place in many instances in order for targeted parties of telemarketing calls to avoid receiving such calls at undesirable hours. Thus, various regulations have been established limiting the times during which telemarketing calls can be placed. For example, federal regulations may limit the calling window for telemarketing calls to between 8:00 a.m. and 9:00 p.m. based on the local time of the targeted party. Furthermore, some states have their own regulations that may offer slightly more restrictive calling windows. For example, some states may have more restrictive calling windows for certain days (e.g., Sunday). In addition, in some instances, the calls may not be telemarketing calls and hence may not be limited by telemarketing calling windows. However a contact center or originator may nevertheless limit calls to be within a calling window to avoid causing a nuisance to targeted parties. Furthermore, in some instances, a targeted party may identify times that the party prefers to be contacted and such preferences may define a calling window for that party. Thus, calling windows may be used for non-telemarketing calls as well.

With that said, a "calling window" may not only be applicable with respect to placing calls to a party. In addition, a "calling window" may be applicable with respect to other types of communications such as text messages. For example, a particular party may prefer to only receive telephone calls from 12:00 a.m. until 5:00 p.m. but may also be willing to receive text messages from 8:00 a.m. until 9:00 p.m. Thus, in this instance a first calling window from 12:00 a.m. to 5:00 p.m. has been defined by the party for placing calls to the party and a second calling window from 8:00 a.m. until 9:00 p.m. has been defined by the party for sending text messages to the party. Therefore, although such windows may be called "calling windows," use of the term "calling" does not means such windows are only limited to defining time periods wherein calls can be placed to targeted parties.

In many instances, a contact center originating a communication to a targeted party may be located in a different geographical area and, accordingly, in a different time zone than the targeted party. For example, a contact center may be located in the Eastern Time Zone and a targeted party may be located in the Pacific Time Zone and thus the contact center and targeted party will have a three-hour difference of time. That is, when it is 8:30 a.m. in the Eastern Time Zone where the contact center is located, it will be 5:30 a.m. in the Pacific Time Zone where the targeted party is located. Therefore, using an example of an applicable calling window of 8:00 a.m. to 9:00 p.m., it would be appropriate for the contact center to originate a call at 8:30 a.m. to a targeted party in the Eastern Time Zone, but it would not be appropriate for the contact center to originate a call at 8:30 a.m. to a targeted party in the Pacific Time Zone. Since there is a direct correlation between a geographical location and its corresponding time zone, it is appropriate to refer to the targeted party as being located in a particular time zone.

Accordingly, when reference is made to the "local time" without any further qualification in this disclosure, such reference typically refers to the local time relative to the targeted party, e.g., the time at the targeted party's location, unless stated otherwise. Because the contact center may be located in a different time zone, the local time for the contact center can be a number of hours ahead or behind the targeted party's local time. One approach for determining the local time of the targeted party is based on determining the location of the targeted party. If the location is determined, then the time can be determined. For instance, the targeted party's local time can be determined by first determining the time zone for the targeted party's location and then determining the number of hours offset (either added or subtracted) from the contact center's current time to arrive at the targeted party's local time.

Looking now at FIG. 1, a process flow is provided for determining whether to originate a communication (e.g., place a call or send a text message) to a targeted party's mobile device based on whether the mobile device is located in a place where the local time is within the applicable calling window. The approach for this process is to request information from the mobile device that can then be used to determine the local time where the device is located. Depending on the embodiment, the requested information can include a variety of types of information such as the mobile device's geo-location, the time zone in which the device is located, the device's time (e.g., the current time on the device), the targeted party's preferences for being contacted, or any combination thereof.

The requesting of this information may be accomplished through a number of different mechanisms depending on the embodiment. For instance, the cellular carrier used by the targeted party for the mobile device may be able to provide such information by querying the mobile device and/or pinpointing the mobile device's location, using various technologies such as triangulation of cell towers or the GPS chip on the mobile device. In particular instances, the time zone and/or local time can then be derived from the location of the mobile device. However, in other instances, such information may be provided by a software application residing on the mobile device.

As is discussed in greater detail below, in various embodiments, a software application may be downloaded to the targeted party's mobile device and this software application may be configured to provide information about the device upon request. Depending on the embodiment, the contact center may request information about the mobile device directly from the software application or the contact center may request the information from the cellular carrier, who may then gather the information from the software application.

For purposes of explaining the various embodiments of the invention, an example is now provided involving the use of a software application that resides on the targeted party's mobile device to gather information on the device. It should be understood that this example is provided to help facilitate the reader's understanding of the various embodiments of the invention and should not be viewed as limiting the scope of the invention. In this example, a banking institution has developed a software application that can be downloaded to a customer's mobile device so that the customer may use the application to perform certain transactions with respect to one or more accounts the customer has with the bank. For instance, a customer may have checking and savings accounts with the bank and the application is configured to allow the customer to transfer funds between the two accounts.

In this example, the bank has also configured the software application to provide information about the mobile device upon request. For instance, the software application may be configured to provide the mobile device's geo-location, the current time on the device, the time zone the device is located in, the customer's preferences for being contacted, or any combination thereof. Therefore, the customer downloads the software application to his mobile device for use. Depending on the circumstances, at the time of download, the customer may be requested to register the application for his device. Such registration may allow a party (such as the banking institution or a contact center) to track the mobile device and request information from the device such as customer preferences, geo-location, time zone, and/or the current time on the device. Furthermore, such registration may provide a party with permission to utilize the tracking capabilities of the software application and/or may allow the customer to define preferences for being contacted. Finally, in particular instances, the software application may also allow the customer to define and manage preferences for being contacted.

Thus, the banking institution has a new savings account product and contracts a contact center to conduct an outbound campaign to inform its customers of this product. In this instance, the outbound campaign involves placing outbound telephone calls to the customers. However, one should understand that other forms of communications may be used to conduct the outbound campaign such as sending text messages to the customers instead of placing calls. Accordingly, the contact center puts together a contact list of customers and begins processing the list to contact the customers and inform them of the banking institution's new product. Turning now to FIG. 1, the contact center selects the customer's mobile device number from the list and determines the customer has downloaded and registered the banking institution's software application. In turn, in Step 101, the contact center requests device information for the customer's mobile device so that the contact center may use such information to ensure the local time where the customer is currently located is within the applicable calling window to place a call to the customer.

Depending on the embodiment, the contact center may make the request directly to the software application residing on the customer's mobile device or may make the request to the customer's cellular carrier and the carrier may then forward the request or generate a new request to the software application. For example, the contact center may send the request directly to the software application over the carrier's cellular network or over the Internet (e.g., the mobile device may be connected to the Internet directly or via Wi-Fi). In response, the software application receives the request and gathers the information accordingly. While in other instances, information on the customer's mobile device may be retrieved periodically from the device and stored. For example, the customer's cellular carrier may retrieve information on the customer's mobile device every three hours from the device and store the information. Thus, in these instances, the contact center may request the information from the cellular carrier and the carrier then returns the most current information from that device that has been stored. In other instances, the contact center may access the storage directly or the contact center may carry out the process of retrieving and storing the information from the device periodically.

For purposes of this example, the information includes one or more of: the customer's preferences for being contacted, the geo-location of the device, the current time on the device, and a derived time zone. For example, depending on the embodiment, the software application may use the geo-location, the device time, or both and determine the current time zone the device is located in. Once gathered, the software application returns the information to the contact center. In turn, the contact center receives the information from the software application in Step 102.

From this information, in particular embodiments, the contact center then determines the current time zone for the mobile device based on the geo-location and/or current time of the device provided by the software application in Step 103. Although in this example the software application has provided a current time zone for the device, the contact center also determines the current time zone for the device based on the received information to ensure the information provided to the contact center is accurate and has not been corrupted. Likewise, in Step 104, the contact center also determines the local time for the mobile device from the received geo-location and/or time zone.

At this point, in Step 105, the contact center compares the device information (both received and derived) to ensure the determined local time for the customer's mobile device is accurate. If the contact center determines the information does agree in Step 106, then the contact center retrieves the applicable calling window for the particular call to be made to the customer in Step 107. In some instances, as previously mentioned, the applicable calling window may be determined from preferences defined by the customer. For example, depending on the embodiment, these preferences may be retrieved from the mobile device along with the other information requested from the device or may be retrieved from a source external to the mobile device such as the customer's mobile cellular carrier who gathers and stores the preferences and then provides the preferences along with the other requested information at the time of the request.

Therefore, returning to the example, the contact center determines the local time for the customer's device is 6:30 p.m. on a Thursday and the applicable calling window for placing a call to the customer on a Thursday is 9:00 a.m. to 8:00 p.m. Thus, in Step 108, the contact center determines whether the local time where the customer's mobile device is located is within the applicable calling window. In this instance it is, so the contact center places the call to the customer mobile device in Step 109.

Accordingly, as a result of obtaining information directly from the customer's mobile device, the contact center can ensure the outbound call placed to the customer is in compliance with the applicable calling window. Provided below is a more detailed discussion with respect to the various components of this process.

Exemplary Architecture for Calling Window Determination

FIGS. 2A and 2B show embodiments of architectures 200A, 200B that may be employed to gather information for a mobile device 205 to determine whether the local time where the mobile device 205 is located is within an applicable calling window in accordance with various technologies and concepts disclosed herein. Beginning with FIG. 2A, the architecture 200A in this figure involves a contact center 210 directly contacting a targeted party's mobile device 205 to obtain information from the device 205 so that the contact center can gather the targeted party's preferences and/or determine the current local time (and/or time zone) for the device 205. As previously described, depending on the embodiment, the information obtained from the mobile device 205 may be the geo-location for the device, the current time for the device, the time zone the device is located in, or any combination thereof. Furthermore, in particular embodiments, the customer may have identified one or more preferences (e.g., preference information) for being contacted that have been stored on the device. For instance, in particular embodiments, the customer may have identified preferred times the customer would like to be contacted while registering and installing a software application on the customer's mobile device. While in other embodiments, the software application may provide a screen that allows the customer to identify such preferences. Accordingly, such information may also be obtained from the mobile device 205.

Typically, the contact center 210 sends a request 206 for information over a communication channel 215, such as a cellular network and/or the Internet, directly to the targeted party's mobile device 205. In particular embodiments, such communication may take place between the contact center 210 and the mobile device 205 via the software application residing on the mobile device 205. While in other embodiments, the mobile device 205 may be configured to provide such functionality without the need of the software application.

In turn, the mobile device 205 gathers the requested information and returns the information in a response 207 back to the contact center 210. As a result, the contact center 210 uses the information provided by the targeted party's mobile device 205 to determine the local time for the mobile device 205 to ensure that a communication originated to the mobile device 205 will be within the applicable calling window of time.

Similarly, for the architecture 200B shown in FIG. 2B, the contact center 210 sends a request to gather information from the targeted party's mobile device 205. However, for this particular architecture 200B, the contact center 210 instead sends the request 208 to the cellular carrier 220 for the mobile device 205 and the cellular carrier 220 queries the formation from the mobile device 205. Again, the initial request 208 sent from the contact center 210 to the cellular carrier 220 may be over some type of communication channel 215 such as the Internet. Once the cellular carrier 220 has collected the needed information from the mobile device 205, the cellular carrier 220 returns the information in a response 209 back over the communication channel 215 to the contact center 210. As in the case with the first architecture 200A, the contact center 210 then uses the information to determine the local time for the mobile device 205 to ensure that a communication originated to the mobile device 205 will be within the applicable calling window of time.

Figure 2C:
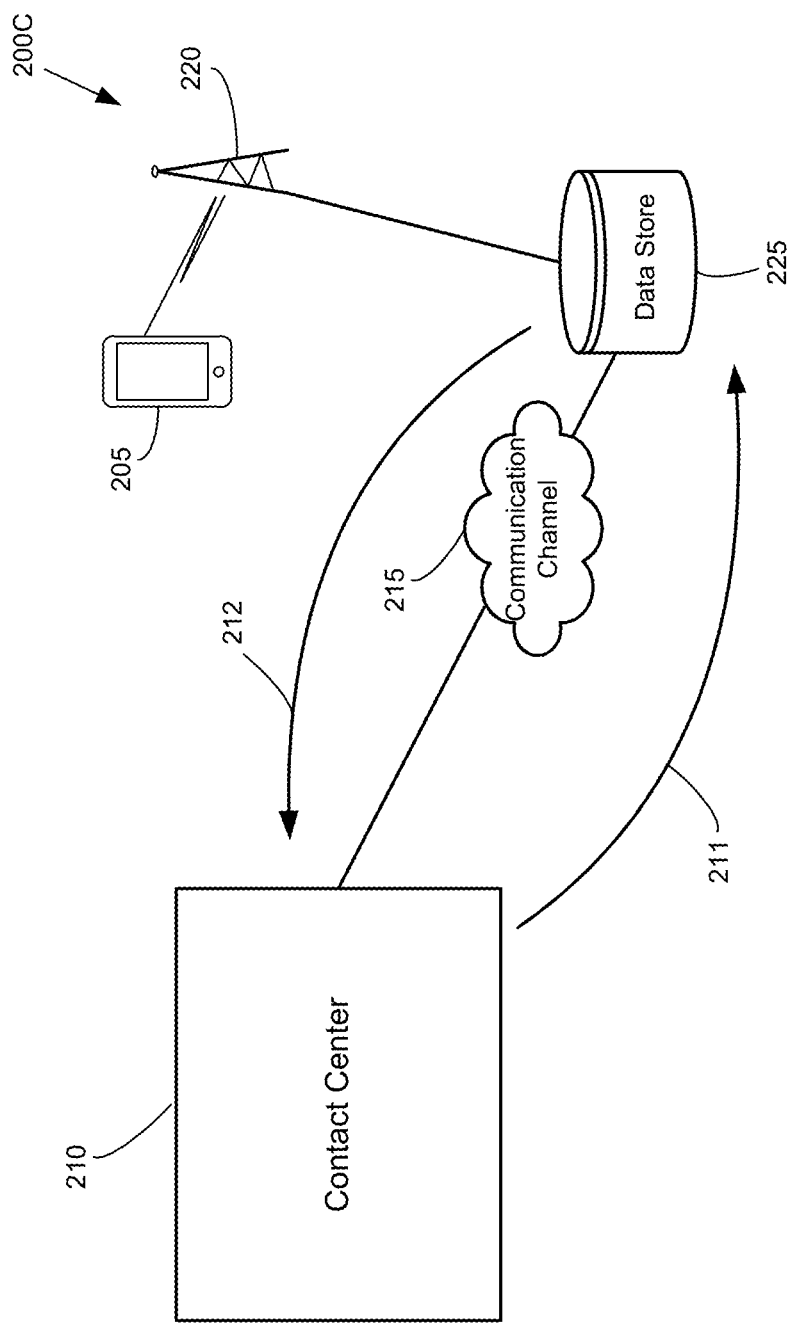

Finally, for the architecture 200C shown in FIG. 2C, the cellular carrier 220 stores information obtained from the mobile device 205 in some type of data store 225 and the contact center 210 then accesses the data store 225 to obtain the information about the mobile device 205. Thus, for this particular architecture 200C, the cellular carrier 220 may collect information from the mobile device 205 periodically and store the information in the data store 225. Further, the initial request 211 from the contact center 211 may constitute a query sent over some type of communication channel 215 such as the Internet to the data store 225. In response, the data store 225 may return the needed information for the mobile device 205 in a response 212 back over the communication channel 215 to the contact center 210. As in the case with the first two architectures 200A, 200B, the contact center 210 then uses the information to determine the local time for the mobile device 205 to ensure that a communication originated to the mobile device 205 will be within the applicable calling window of time.

It should be noted that in particular embodiments, the data store 225 may not be directly accessible by the contact center 210 and the contact center 210 may instead send the request for information to the cellular carrier 220 and the carrier 220 may then access the data store 225 and return the needed information back to the contact center 210. While in other embodiments, the data store 225 may be maintained by the contact center 210 instead of the cellular carrier 220. In these particular embodiments, the contact center 210 may obtain the information about the mobile device 205 directly from the device 205 or from the cellular carrier 220. Accordingly, those of ordinary skill in the art can envision other architectures in light of this disclosure that may be employed to gather information for a mobile device 205 to determine whether the local time where the mobile device 205 is located is within an applicable calling window of time.

Exemplary Software Application Download Architecture

Figure 3:
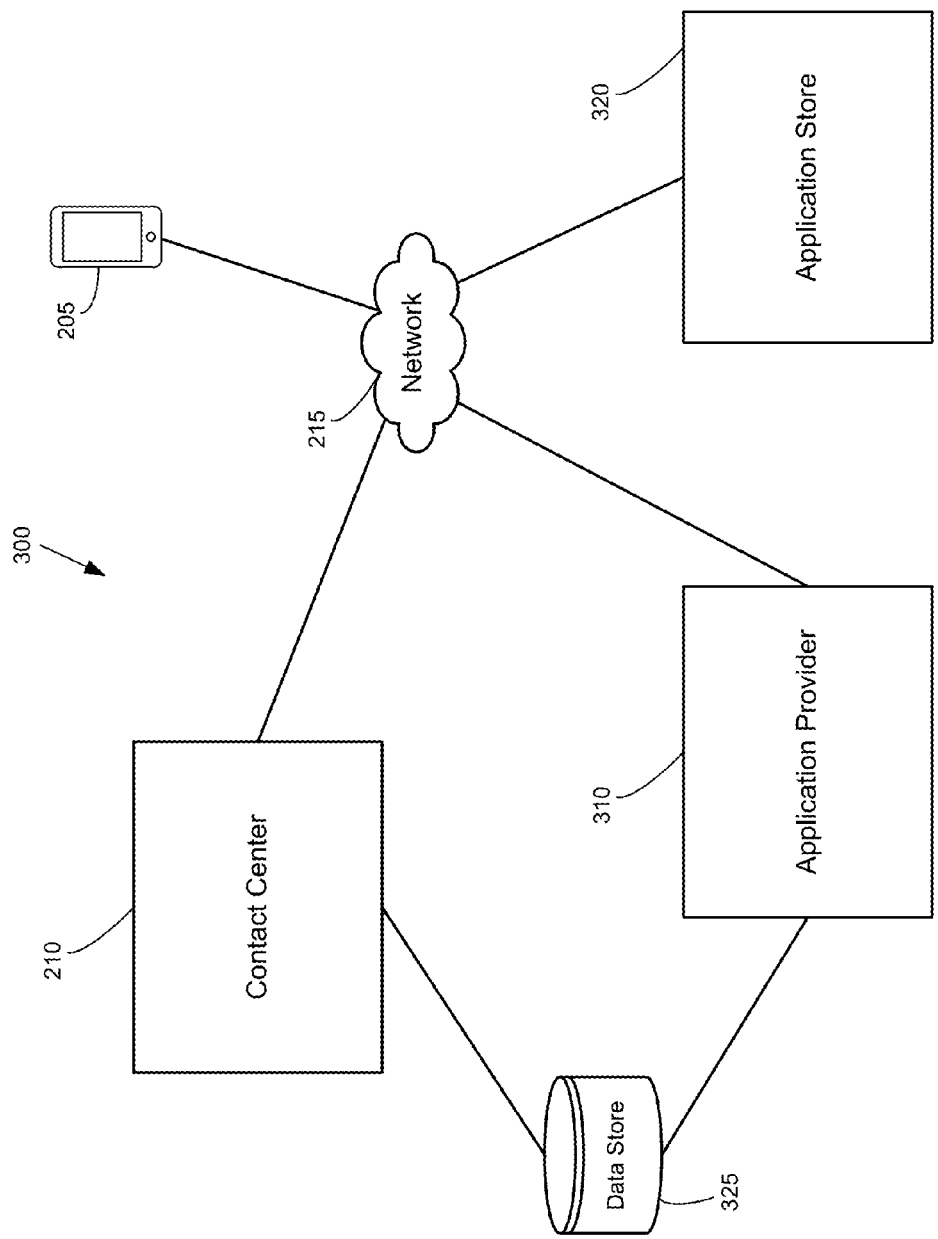
FIG. 3 shows an architecture that may be employed to download a software application to a party's mobile device in accordance with various technologies and concepts disclosed herein.

FIG. 3 shows one embodiment of an architecture 300 that may be used in providing a software application that may be downloaded to a party's mobile device 205 in accordance with various technologies and concepts disclosed herein. The architecture 300 shown in FIG. 3 involves three different parties in communication over a network 215 such as the Internet or some other type of network such as a LAN, wide area network, wireless network, router, bridge, direct point-to-point links, etc. The first of these parties is a contact center 210 that may have some component (e.g., a server) of its system in communication with one or more of the other parties over the network 215.

The second of these parties is an application provider 310. The application provider 310 is typically an entity interested in providing a software application that can be downloaded to an individual's mobile device 205. For instance, returning to the example discussed above, a banking institution may wish to provide its customers with a software application that customers may use on their mobile devices 205 to log into the customers' accounts and perform transactions such as transferring funds from a savings account to a checking account. Thus, in this instance, the banking institution has the software application developed so that it may be provided to its customers. Once downloaded to a customer's mobile device 205, the software application may need to communicate with the banking institution over a communication channel (e.g., a network 215 such as the Internet or a cellular network) to perform certain functionality.

The third of these parties is an application store 320. The application store 320 is typically responsible for providing the software application for download to an individual's mobile device 205. For instance, common application stores 320 may be considered Apple's® App Store or Google's® App Store. Returning to the example involving the banking institution, the banking institution develops the banking software application and provides the application to the application store 320. Once the application store 320 approves the banking software application, the application store 320 makes the banking software application available on its system. Depending on the application store 320, this may involve the application store 320 having a software application that is used on an individual's mobile device 205 to access the application store 320 and browse the application store's software applications available to download to the individual's mobile device 205 and/or a web site provided by the application store 320 that the individual may visit to browse the application store's software applications.

Thus, an individual with a mobile device 205 communicates with the application store 320 over a network 215 (e.g., the Internet) and downloads an available software application to the individual's mobile device 205. In particular instances, prior to or during download, the individual may be required to agree to certain terms and/or register before being able to download and/or use the software application. For instance, returning to the example, the banking institution may require its customers to register and agree to certain terms with respect to using the banking institution's software application to perform certain transactions using the application such as transferring funds from one account to another. In addition, the individual may be asked to provide preferences on how and when the individual may be contacted. For instance, the individual may identify that he prefers to be contacted between the hours of 8:00 a.m. and 7:00 p.m. on weekdays and 10:00 a.m. to 3:00 p.m. on weekends. Further, in particular instances, the individual's registration, agreement to such terms, and/or preferences may be communicated to the application provider 310 and the provider 310 may save the registration, agreement to terms, and/or preferences in some type of data store 325 for future reference. Depending on the embodiment, the data store 325 may be any one of different types of storage media such as SAN storage or NAS storage and may include one or more databases. In addition, in some instances, the registration, agreement to the terms, and/or preferences may be communicated to the contact center 210. While in other instances, the contact center 210 may access the data store 325 or request the application provider 310 for information on the registration, agreement to the terms, and/or preferences. As discussed further below, in these particular instances, the contact center 210 may require such information to ensure the individual has agreed to being contacted by the contact center 210, has agreed to having information about the individual's mobile device 205 gathered, and/or has identified preferable calling windows for being contacted.

Exemplary Contact Center Architecture

Figure 4:
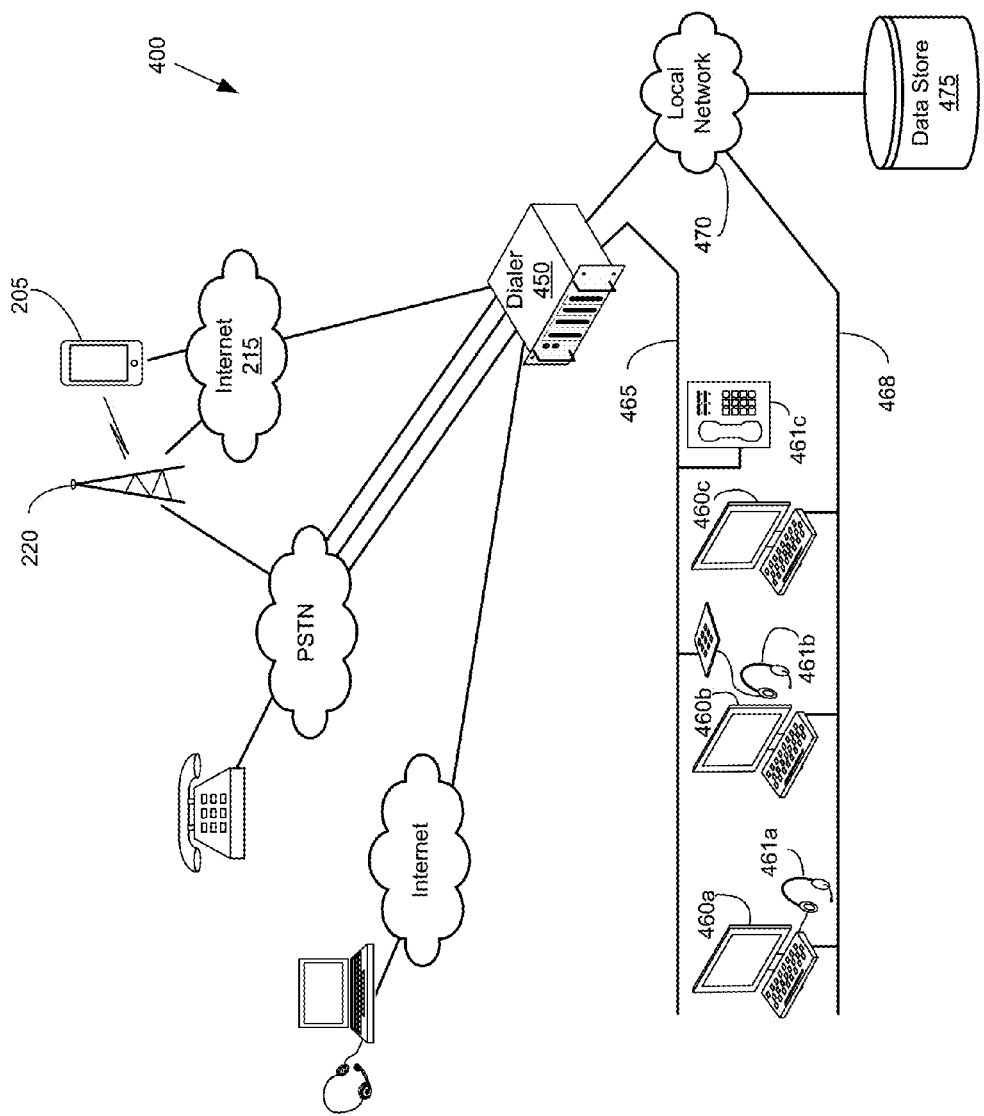
FIG. 4 shows an architecture of a contact center that may employ the various technologies and concepts disclosed herein.

FIG. 4 shows one embodiment of a contact center architecture 400 illustrating the various technologies disclosed herein. The contact center architecture 400 shown in FIG. 4 may represent one embodiment of the contact center 210. Although many aspects of contact center operation are disclosed in the context of voice calls, in various embodiments, the contact center 210 may process other forms of communication such as, for example, facsimiles, emails, text messages, video calls, and chat messages.

In various embodiments, the contact center 210 employs a dialer 450, such as a predictive dialer, to originate outbound calls on behalf of one or more agents at a rate designed to meet various criteria. In particular embodiments, the dialer 450 may be configured to process not only voice calls, but also other forms of communication such as emails, text messages, chats, or facsimile calls. Depending on the embodiment, each outbound communication originated by the dialer 450 may be directed to any number of devices associated with a targeted party such as, for example, a computer, telephone, or mobile device 205. In addition, the dialer 450 may communicate with the mobile device 205 directly over a network 215 such as the Internet or via the cellular carrier 220 for the mobile device 205. Further, similar to the other components within the contact center architecture 400, in particular embodiments, the dialer 450 may comprise one or more software modules executing on a processing device hardware platform.

In various embodiments, the dialer 450 originates outbound communications such as, for example, telephone calls or text messages by processing one or more dialing lists comprising a collection of records providing contact information (e.g., account numbers, telephone numbers, etc.) for originating the outbound communications. Thus, depending on the embodiment, the dialing list(s) may include hundreds or thousands of records and the records may or may not be sorted in any particular order. In addition, depending on the embodiment, the dialer 450 may or may not dial the records in the dialing list(s) in sequence.

In particular embodiments, the collection of records are retrieved from a data store 475 to compile the dialing list(s). Depending on the embodiment, the data store 475 may comprise any number of different types of storage media and may be configured to store the collection of records in a number of different ways. For instance, in one embodiment, the data store 475 may comprise SAN storage or NAS storage that includes one or more databases for storing the collection of records.

With respect to telephone calls, once a targeted party is reached in various embodiments, the dialer 450 connects the outbound call to one of a plurality of contact center agents. For instance, in particular embodiments, the dialer 450 connects the outbound call over facilities 465 to an agent for servicing so that the targeted party may speak with the agent. Likewise, once a targeted party responds to a communication such as a text message or email, the dialer 450 may also process the response (e.g., routes the response) over facilities 468 to an agent for servicing. The physical area at which the agent sits is often referred to as an agent "position" and these positions are often grouped into clusters managed by a supervisor, who may monitor calls and the agents' productivity. An agent typically uses a computing device 460a-460c, such as a workstation computer, and a voice device 461a-461c. In particular instances, data may be provided to an agent's computing device 460a-460c along with routing a communication such as a call to the agent's voice device 461a-461c. While in other instances, both the data and the communication are provided to an agent's computing device 460a-460c. The combination of computing device 460a-460c and voice device 461a-461c may be referred to as a "workstation." Thus, for these particular embodiments, the workstation collectively has a data capability and a voice capability, although separate devices may be used. In some instances, "workstation" may be used in reference to either the data or voice capability at the agent's position. For example, "routing the call to the agent's workstation" means routing a call to the voice device 461a-461c at the agent's position. Similarly, "routing a communication to the agent" means routing the communication to the appropriate equipment at the agent's position.

The above components may be referred to as a "computing device," "processing device," or "system." In addition, one or more of the components may incorporate a local data store and/or interface with an external data store. Depending on the embodiment, interaction between these components (e.g., the dialer 450, the data store 475, and agent computers 460a-460c) may involve using a local area network ("LAN") 470. However, other configurations are possible, such as, but not limited to, using a wide area network, wireless network, router, bridge, direct point-to-point links, etc. Further, the above components may be located remotely from (or co-located with) other components. Furthermore, one or more of the components may be implemented on a single processing device to perform the functions described herein. For example, in various embodiments, the functionality of the dialer 450 may also be incorporated with other contact center components. In addition, in particular embodiments, the contact center architecture 400 may be provided as a hosted solution, where the call processing functionality is provided as a communication service (a so-called "communication-as-a-service" or "CaaS") to a contact center operator. Thus, there is no requirement that the components identified above actually be located or controlled by a contact center operator.

In addition, depending on the embodiment, the agent positions may be co-located in a single physical contact center 210 or multiple physical contact centers 210. The agents may be remotely located from the other components of the contact center 210, and may also be remotely located from each other, sometimes referred to as a "virtual contact center." In particular instances, a virtual contact center 210 may describe a scenario in which agents work at home, using their own computers and telephones as workstations. In some configurations, a single physical location of the contact center 210 may not be readily identifiable. For instance, this may occur when the call processing functions are provided as a service in a hosted cloud computing environment and the agents positions are in their individual residences.

Those skilled in art will recognize FIG. 4 represents one possible configuration of a contact center architecture 400, and that variations are possible with respect to the protocols, facilities, components, technologies, and equipment used. For example, various algorithms and queuing arrangements may be defined to efficiently process calls to agent and/or place outbound calls.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Downloading Module

Figure 5:
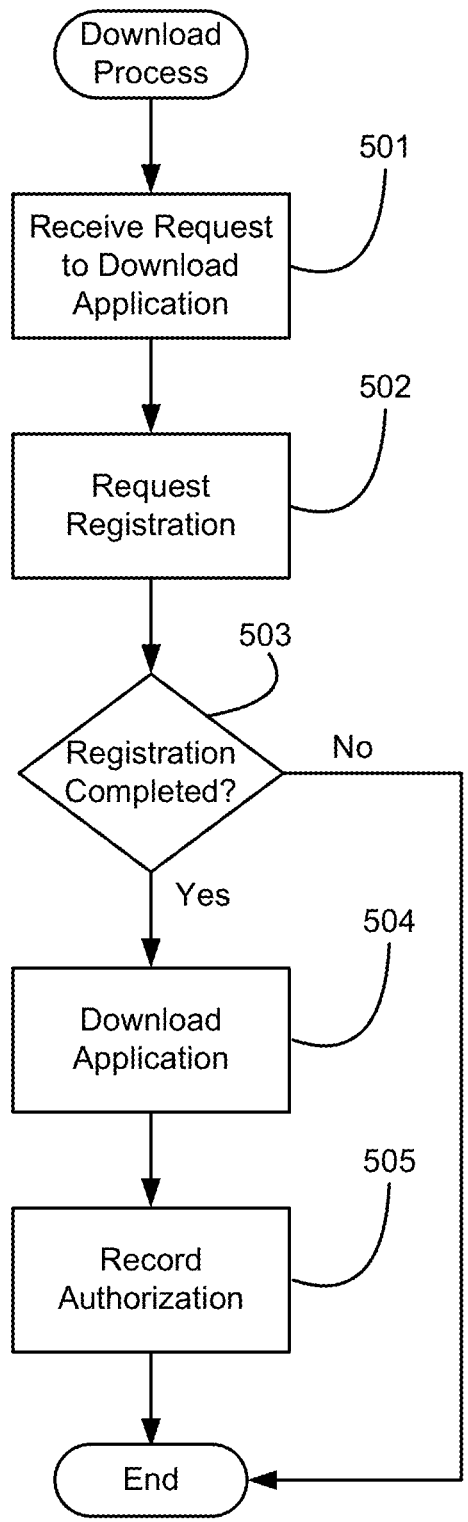
FIG. 5 illustrates an embodiment of a process flow that may be used in downloading and registering a software application to a party's mobile device in accordance with various technologies and concepts disclosed herein.

Turning now to FIG. 5, additional details are provided regarding a process flow that may be used in downloading and registering a software application to a party's mobile device 205 according to various embodiments. Again, for purposes of explaining the process, the description will focus on the example involving the banking institution. Specifically, FIG. 5 is a flow diagram showing a downloading module for performing such functionality according to various embodiments of the invention. For example, the flow diagram shown in FIG. 5 may correspond to operations carried out by a processor in a component, such as a server, located within an application store 320 as it executes the downloading module stored in the component's volatile and/or nonvolatile memory.

Therefore, a customer of the banking institution visits the application store 320 (e.g., via a web site or the application store's software application residing on the customer's mobile device 205) and browses through the software applications available from the application store 320 and locates the banking institution's software application. The customer reviews the software application and decides to download the application to his mobile device 205 and selects a button to do so. In turn, the downloading module receives a request to download the software application in Operation 501.

At this point, the downloading module requests the customer to register before the software application can be downloaded to the customer mobile device 205 in Operation 502. Depending on the embodiment, registration may involve the customer providing account information for the banking institution so that the banking institution can confirm the customer is actually a customer of the banking institution and what accounts are associated with the customer. In addition, registration may involve using some type of mechanism to confirm the customer is actually who he says he is to avoid providing access to accounts to an impostor. For example, the customer may be sent a text message to a device previously registered by the customer with the banking institution. In this example, the text message includes a code the customer enters during the registration for downloading the banking institution's software application to confirm that the customer is who he says he is and is not an impostor. Furthermore, the registration may involve the customer identifying preference information such as identifying what hours the customer would prefer to be contacted, what days the customer would prefer to be contacted on, and/or what methods of contact the customer would prefer to receive such as, for example, text messages and/or telephone calls. Finally, the registration may involve the customer agreeing to certain terms to be able to download and use the software application. For example, the customer may consent to being contacted about fraud alerts involving his account, being contacted about new product offerings, and/or agree to have the software application convey certain information (e.g., geo-location or current time) about the customer's mobile device 205 upon request.

In Operation 503, the downloading module determines whether the customer has successfully registered. If so, in Operation 504, the downloading module downloads the banking institution's software application to the customer's mobile device 205. Finally, in Step 505, the downloading module records the registration of the customer. Depending on the embodiment, this step may involve forwarding the registration information to the banking institution so that the banking institution may save the registration information and/or forwarding the registration information to the appropriate contact center 210. At this point, the customer may now start using the software application to perform certain transactions such as, for example, viewing the current balance in a checking account, transferring funds from one account to another, and/or finding the closest ATM for the banking institution.

Mobile Device Module

Figure 6A:
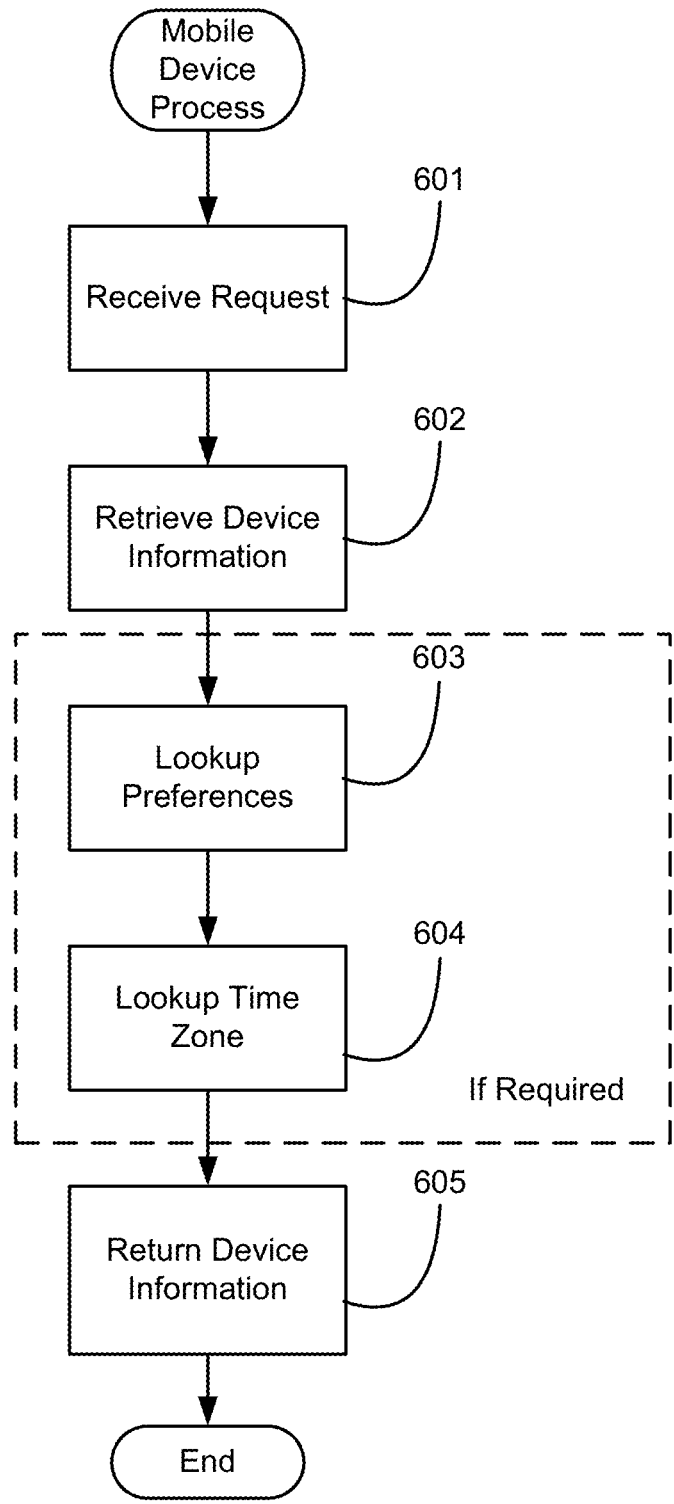
FIGS. 6A and 6B illustrate embodiments of process flows that may be used by a mobile device to provide information in accordance with various technologies and concepts disclosed herein.
Figure 6B:
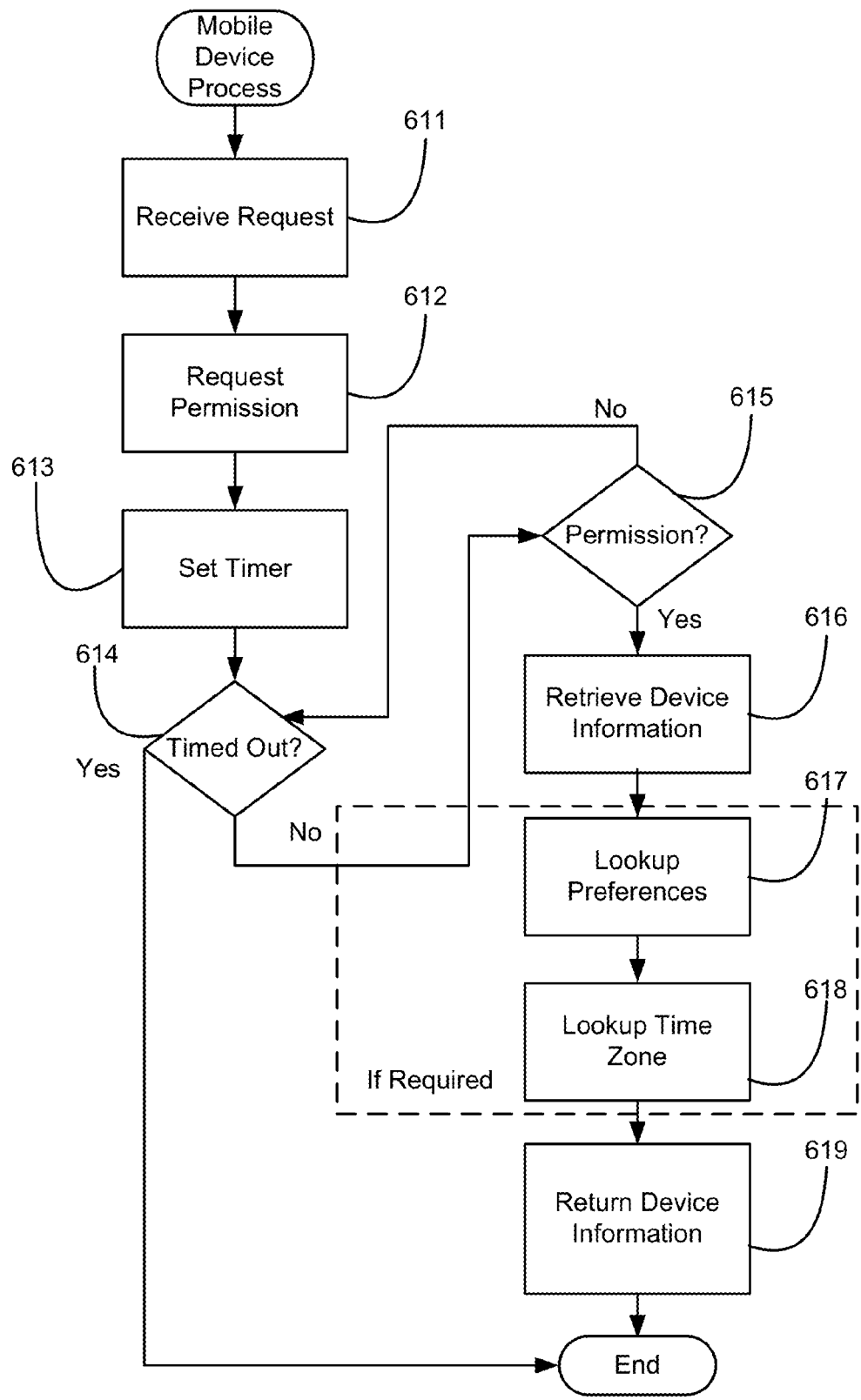

FIGS. 6A and 6B illustrate additional details regarding process flows that may be used on a party's mobile device 205 to gather and provide information about the device 205 according to various embodiments. Depending on the embodiment, these process flows may be carried out by a module that has been installed on the device 205 prior to the party receiving the device 205 or by a module downloaded to the device once the party has received the device 205. For instance, in the example involving the banking institution, the module for carrying out the functionality of these process flows may be the banking institution's software application downloaded to the party's (e.g., customer's) mobile device 205. Regardless of the source of the module, the module is referred to herein as the mobile device module for purposes of describing this module. Thus, FIGS. 6A and 6B are flow diagrams showing various embodiments of the mobile device module. For example, the flow diagrams shown in FIGS. 6A and 6B may correspond to operations carried out by a processor in the mobile device 205 as it executes the mobile device module stored in the mobile device's volatile and/or nonvolatile memory. Again, the example pertaining to the banking institution will be used to explain the embodiments of the process flows performed by the mobile device module.

Turning now to FIG. 6A, for this particular process flow, permission to place a call to the customer and/or to retrieve information from the customer's mobile device 205 is not required at the time the information is retrieved from the device 205. Thus, in Operation 601, the mobile device module receives a request for information. Depending on the embodiment, this request may be received directly from the banking institution or the contact center 210 without being initially sent to the cellular carrier 220 or a request may be initially sent to the cellular carrier 220 and the request is then received by the mobile device module from the carrier 220. Further, depending on the embodiment, the request received by the mobile device module may have been sent over a number of different communication channels such as, for example, the carrier's cellular network or the Internet accessible to the device 205 via Wi-Fi.

At this point, in Operation 602, the mobile device module retrieves the information for the mobile device 205. As mentioned, depending on the embodiment, such information may include preferences for being contacted, the geo-location of the device 205, the current time on the device 205, and/or the time zone the device 205 is currently located in. For instance, the mobile device module may query the device's GPS chip to obtain the geo-location of the mobile device 205, may query the current time of the device 205 from the device's registry, and/or may use one or more lookup tables stored within the module to determine preferences for being contacted and/or the time zone based on the geo-location, and/or current time for the device 205. Thus, if the information to be obtained about the device 205 is the preferences, then the mobile device module looks up the preferences in Operation 603. Likewise, if the information to be obtained about the device 205 is the time zone, then the mobile device module looks up the time zone in Operation 604. Once the mobile device module obtains the required information the module returns the information to the appropriate party (e.g., the contact center and/or the banking institution) in Operation 605.

Turning now to FIG. 6B, this process flow involves similar operations with respect to the operations previously discussed for the process flow in FIG. 6A except this particular process flow also includes operations to obtain the customer's permission to be contacted. Thus, for this particular process flow, the Operation 611 for receiving the request, the Operation 616 for retrieving the device information, the Operation 617 for looking up the preferences, the Operation 618 for looking up the time zone, and the Operation 619 for returning the device information are carried out in the same manner as the similar operations discussed with respect to the process flow shown in FIG. 6A.

The additional operations for this particular process flow first involve the mobile device module requesting permission from the customer to contact him in Operation 612. For instance, in one embodiment, this operation may involve providing some type of notification via the mobile device module itself and the customer responds to the notification to provide permission.

At this point, in particular embodiments, the mobile device module sets a timer for receiving permission from the customer to be contacted in Operation 613. For example, the module may set the time for an hour, eight hours, or twelve hours. Thus, after setting the timer, the mobile device module periodically determines whether the time has expired in Operation 614. For instance, the module may be configured to check the timer every fifteen minutes in a particular embodiment. If the timer has not expired, then the mobile device module determines whether the customer has provided permission in Operation 615. If permission has not been provided, then the mobile device module continues to monitor the timer. However, if the customer has provided permission, then the mobile device module continues by gathering and returning the information about the mobile device 205 as previously described with respect to the process flow shown in FIG. 6A.

Figure 7A:
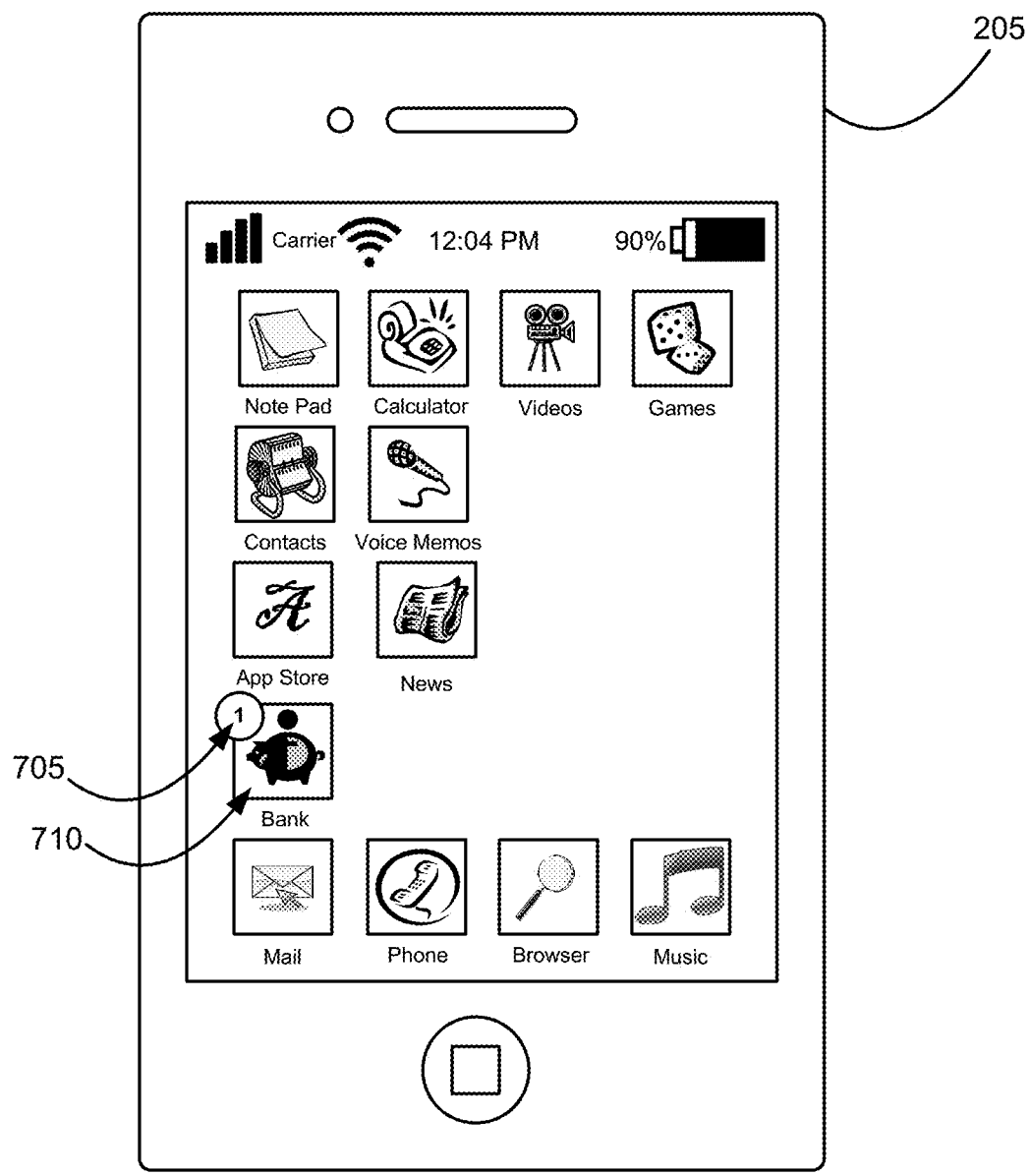
FIGS. 7A, 7B, 7C, and 7D show displays on a mobile device using a software application in accordance with various technologies and concepts disclosed herein.
Figure 7B:
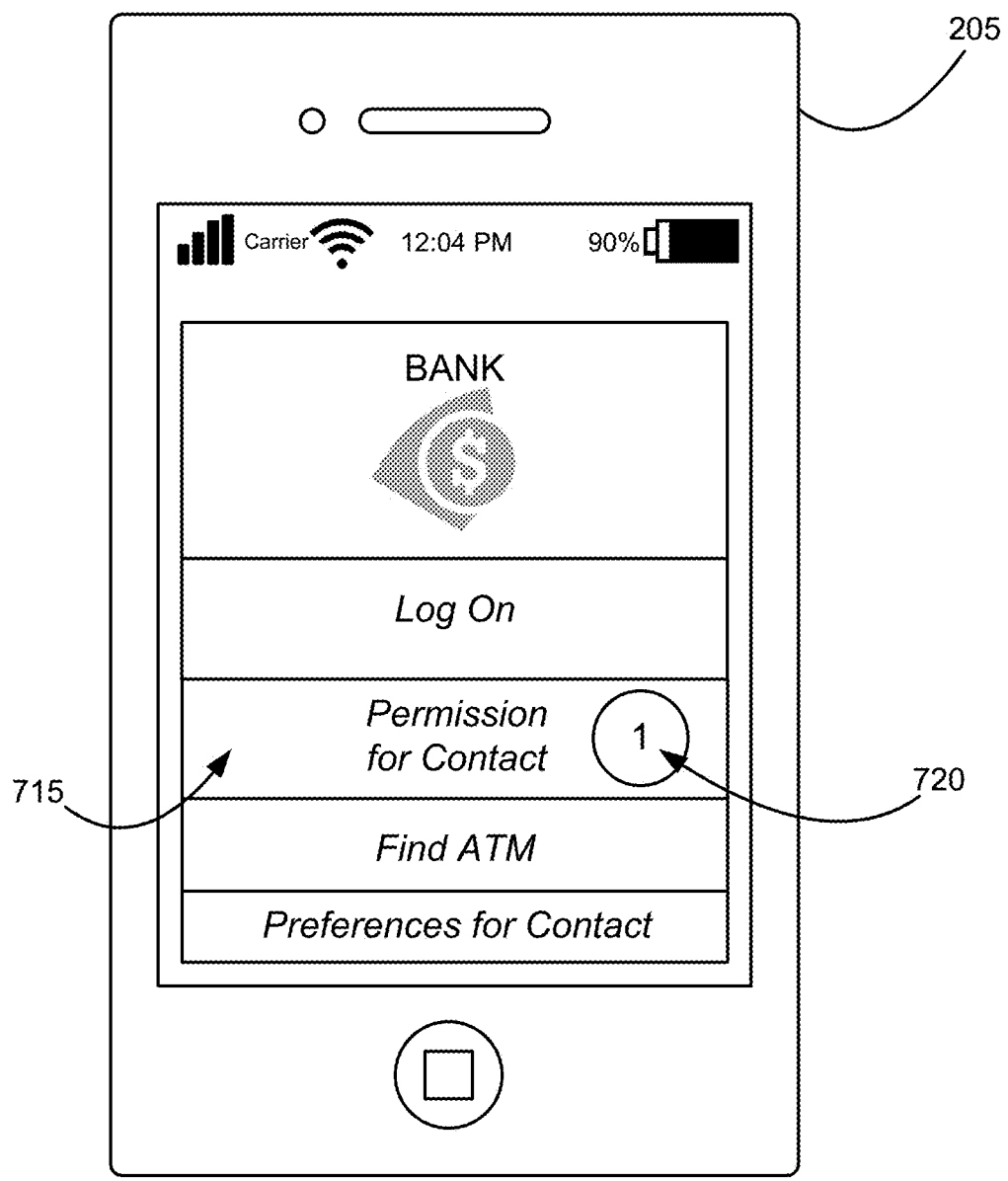
Figure 7C:
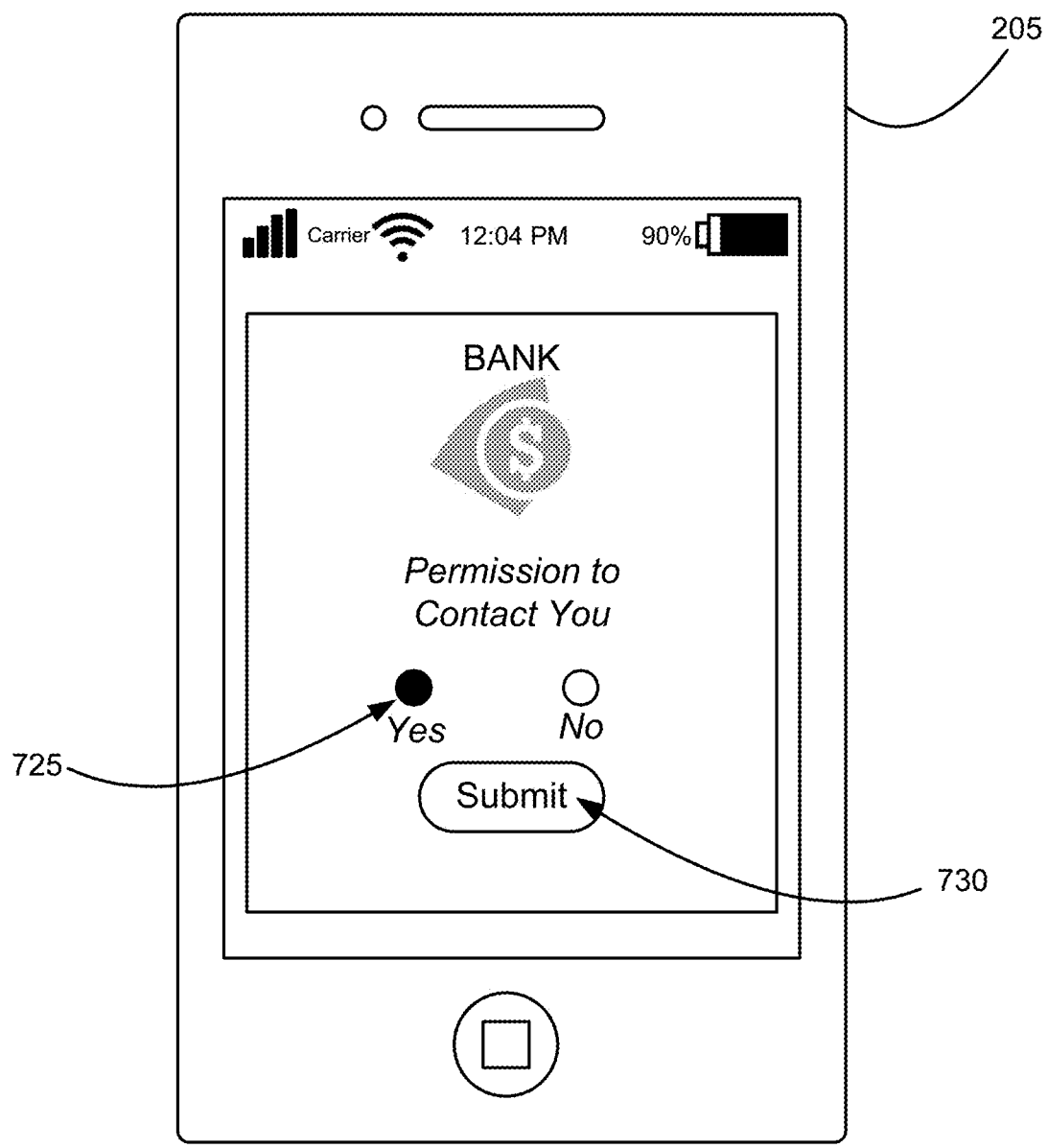

Turning now to FIGS. 7A, 7B, and 7C, these figures provide screen shots of the banking institution's software application (e.g., mobile device module) in which permission is first requested from the customer before the information on the customer's mobile device 205 is gathered and the customer is contacted. In this instance, the software application first seeks the customer's permission before a call can be placed to the customer to discuss a new product offering by the banking institution. Thus, in FIG. 7A, an icon 710 for the banking institution's software application is shown on a main screen of the customer's mobile device 205 and the icon 710 further displays an indicator 705 with the number "1" indicating one message is waiting for the customer.

Therefore, the customer selects (e.g., presses) the icon 710 on the main screen and the display shown in FIG. 7B is provided on the mobile device's screen. In this instance, the option 715 for providing permission to be contacted also displays an indicator 720 with the number "1" indicating a message is waiting for the customer in reference to the customer providing the banking institution with permission to contact the customer. Again, the customer may select the option 715 for providing permission to be contacted and the display shown in FIG. 7C is provided on the mobile device's screen.

At this point, the display allows the customer to indicate whether the customer provides permission to be contacted or not. In this instance, the customer selects the button 725 providing permission to be contacted and selects the "Submit" button 730. In particular embodiments, providing permission also pertains to authorizing querying information (e.g., preferences, geo-location, current time, and/or time zone) from the mobile device 205. In response, the banking institution's software application sends a response to the banking institution and/or contact center 210 that includes the permission and in some instances information about the customer's mobile device 205. Accordingly, the contact center 210 then proceeds in due time to query information about the mobile device 205 and/or contact the customer on his mobile device 205.

Figure 7D:
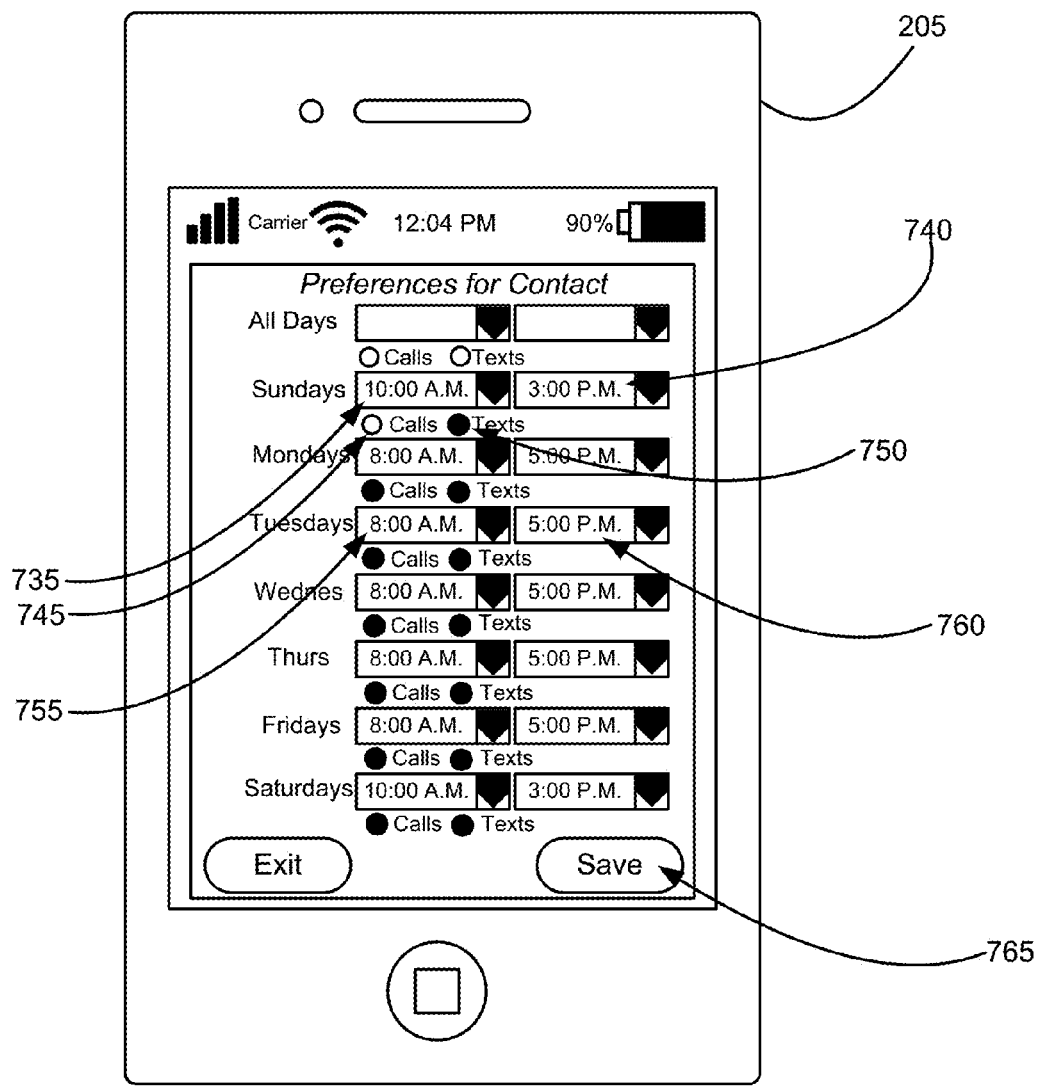

Finally, turning to FIG. 7D, this figure provides a screen shot of one embodiment of a screen for the banking institution's software application (e.g., mobile device module) that allows a customer to identify and manage his preferences for being contacted. In this instance, the screen allows the customer to identify the calling windows for individual days of the week during which he would prefer to be contacted. That is to say, the customer may identify a calling window for a particular day by identifying a begin time for the window and an end time for the window. For instance, the customer has identified a begin time 735 of 10:00 a.m. and an end time 740 of 3:00 p.m. for Sunday. Thus, the calling window during which the customer would prefer to be contacted on Sunday is from 10:00 a.m. until 3:00 p.m. In addition, the customer may identify the type of contacts the customer prefers to receive during the calling window by selecting the appropriate button 745 for calls and the appropriate button 750 for text messages. Therefore, the identified calling window is not necessarily for placing calls to the customer's mobile device but may also be for other types of communications such as text messages or emails that may be received and viewed on the device 205.

Accordingly in this instance, the customer would prefer to only receive text messages on Sunday. Further, the customer has indicated that he would prefer to be contacted on weekdays during a calling window from 8:00 a.m. to 5:00 pm. (e.g., the begin time 755 of 8:00 a.m. and an end time 760 of 5:00 p.m. is set for Monday). Once the customer has identified his preferences for the appropriate days, the customer may select the "Save" button 765 to store information on the preferences. Depending on the embodiment, the preference information may be stored on the customer's mobile device 205 and provided along with other requested information from the device 205 and/or the preference information may be stored at an external location from the mobile device 205 such as at the cellular carrier and/or the contact center.

It should be noted that preferences other than the ones shown in FIG. 7D may be identified and managed using the software application in other embodiments. For instance, in particular embodiments, the customer may also be allowed to identify the reasons for being contacted such as, for example, fraud alerts, overdrawn alerts, and/or when deposits have been credited to the customer's account.

Cellular Carrier Module

Figure 8:
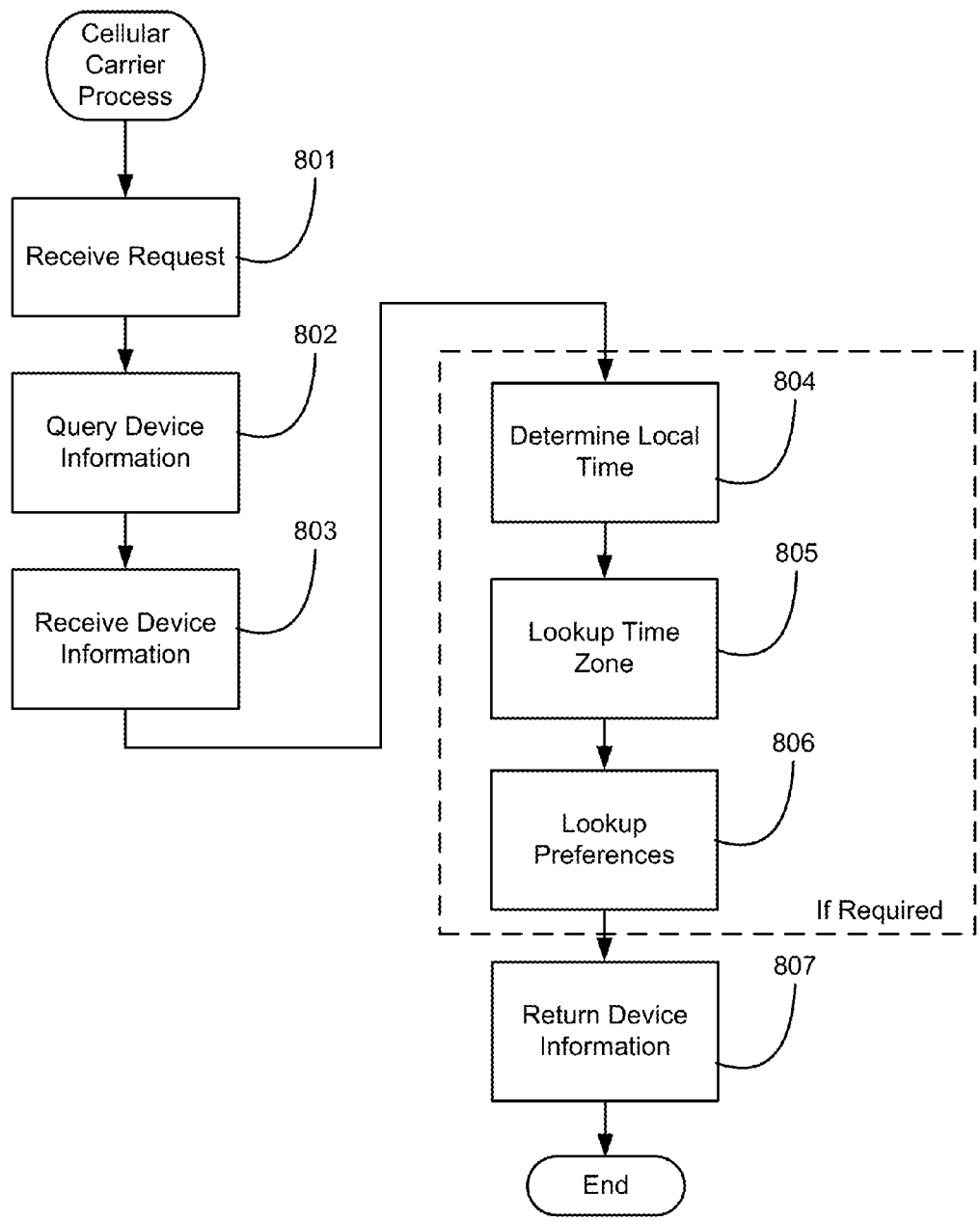
FIG. 8 illustrates an embodiment of a process flow that may be used in receiving and providing information on a mobile device in accordance with various technologies and concepts disclosed herein.

Turning now to FIG. 8, additional details are provided regarding a process flow that a cellular carrier 220 may use in receiving and fulfilling a request for information on a party's mobile device 205 according to various embodiments. Specifically, this process flow involves instances in which the party requesting the information (e.g., the contact center 210) contacts the cellular carrier 220 for the information on a targeted party's mobile device 205 and the cellular carrier 220 then gathers the information from the device 205 and returns the information to the requesting party. Again, for purposes of explaining the process flow, the description will focus on the example involving the banking institution. Specifically, FIG. 8 is a flow diagram showing a cellular carrier module for performing such functionality according to various embodiments of the invention. For example, the flow diagram shown in FIG. 8 may correspond to operations carried out by a processor in a component, such as a server, located within the cellular carrier's system as it executes the cellular carrier module stored in the component's volatile and/or nonvolatile memory.

Thus, the process flow begins with the cellular carrier module receiving the request for the information on the targeted party's mobile device 205 in Operation 801. Depending on the embodiment, this request may be received from any number of different parties such as the contact center 210 that would like to contact the targeted party. Further, depending on the embodiment, the request may include any number of different pieces of information such as the name of the targeted party and/or the targeted party's mobile device telephone number. In addition, in particular instances, the request may include information confirming that the targeted party has provided permission to have information on the party's mobile device 205 obtained and provided to the requesting party.

In response, in particular embodiments, the cellular carrier module queries the targeted party's device 205 for the requested information in Operation 802. At this point, in various embodiments, the mobile device module previously described collects the requested information and returns the information to the cellular carrier module. While in other embodiments, the cellular carrier module queries some type of data store 225 for the requested information in Operation 802. That is, in particular embodiments, the cellular carrier 220 may obtain information from the targeted party's device 205 periodically and store the information accordingly. Thus, when the cellular carrier module receives the request, the cellular carrier module queries the most recent information stored for the targeted party's device 205 from the data store 225.

Thus, in Operation 803, the cellular carrier module receives the requested information on the targeted party's mobile device 205. As previously described, depending on the embodiment, the information on the device 205 returned to the cellular carrier module may include various types of information such as the targeted party's preferences for being contacted, the geo-location of the device 205, the current time displayed on the device 205, and/or the time zone the device 205 is currently located in.

Furthermore, in particular instances, the cellular carrier module may be configured to determine the local time and/or the time zone for the targeted party's mobile device 205 based on one or more pieces of information returned from the mobile device 205. For instance, the information returned from the mobile device 205 may include the geo-location of the mobile device 205 and the cellular carrier module uses the geo-location to determine the local time where the mobile device 205 is located in Operation 804. Likewise, in particular instances, the information returned from the mobile device 205 may include the geo-location and/or current time on the device 205 and the cellular carrier module looks up the time zone for the device 205 in Operation 805. Finally, in particular instances, the cellular carrier module may look up the targeted party's preferences for being contacted in Operation 806 if such information is stored by the carrier and not provided in the information returned from the targeted party's mobile device 205. Once the cellular carrier module has obtained all of the requested information, the cellular carrier module returns the device information to the requesting party in Operation 807.

Contact Center Module

Figure 9:
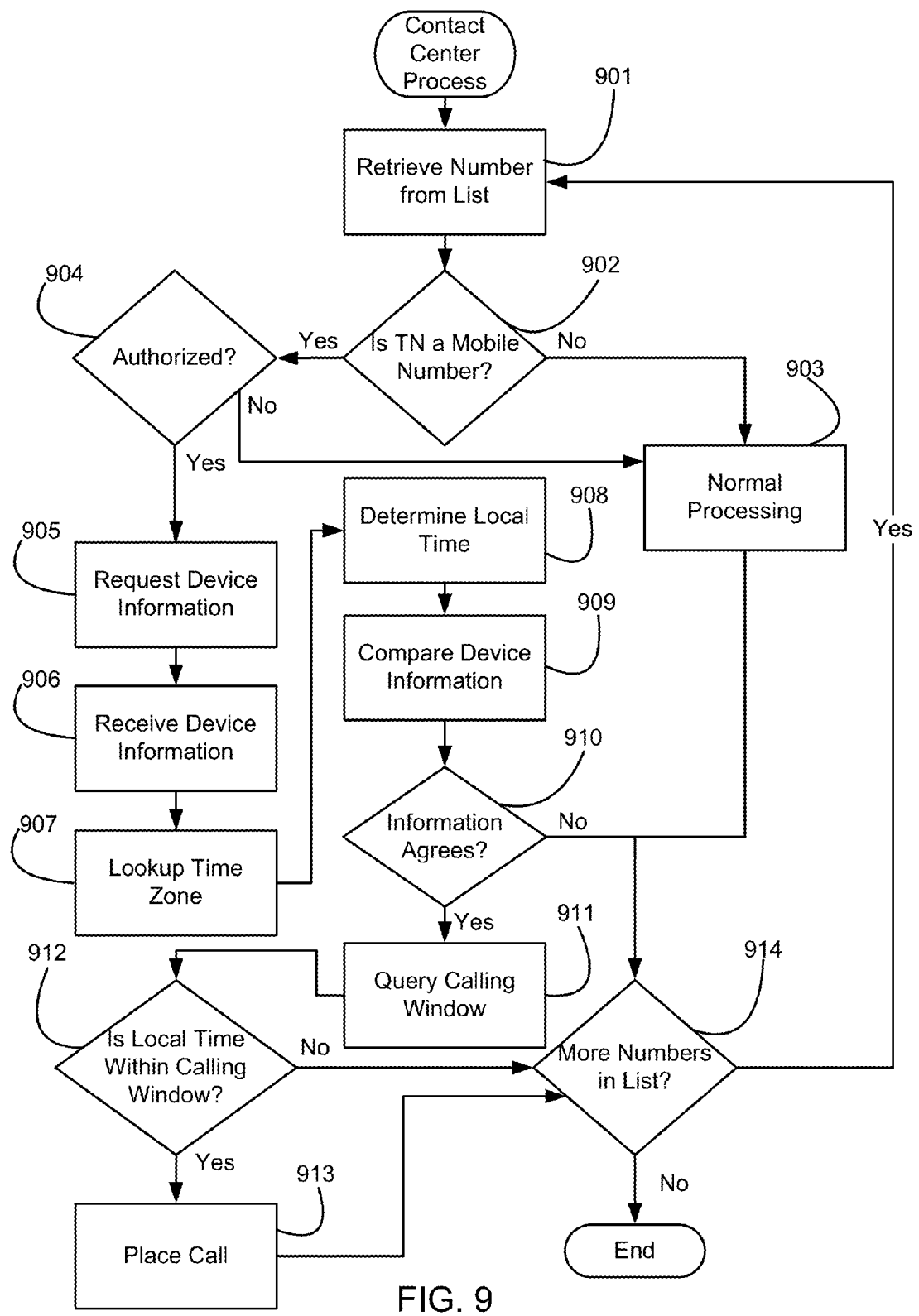
FIG. 9 illustrates an embodiment of a process flow that may be used in determining whether to place a call to a mobile device in accordance with various technologies and concepts disclosed herein.

Turning now to FIG. 9, additional details are provided regarding a process flow that a contact center 210 may use in determining a local time for a targeted party's mobile device 205 according to various embodiments. Again, for purposes of explaining the process, the description will focus on the example involving the banking institution. Specifically, FIG. 9 is a flow diagram showing a contact center module for performing such functionality according to various embodiments of the invention. For example, the flow diagram shown in FIG. 9 may correspond to operations carried out by a processor in a component, such as the dialer 150, located within the contact center's system as it executes the contact center module stored in the component's volatile and/or non-volatile memory.

For this particular process flow, the contact center is conducting an outbound campaign involving placing telephone calls to targeted parties. Thus, as mentioned, a contact center 210 normally constructs a list of contacts (e.g., dialing records) the contact center 210 uses in conducting the outbound campaign. This contact list generally comprises a number of different contacts and the contacts may be arranged in a particular order depending on the circumstances. For instance, the contact center 210 may be conducting an outbound campaign for the banking institution to inform the banking institution's customers of a new savings account product and the contact list may include a number of dialing records for the banking institution's customers. Thus, the contact center module retrieves a dialing record from the contact list in Operation 901. Depending on the embodiment, the record may include different information with respect to the targeted party (e.g., customer of the banking institution) associated with the record such as, for example, the party's mailing address and zip code. However, in general, the record includes a telephone number to be used to contact the targeted party.

In turn, the contact center module determines whether the retrieved telephone number is for a mobile device 205 in Operation 902. For instance, in one embodiment, this operation may require the contact center module to access a database to determine whether the retrieved telephone number is a wireless ported number or a mobile/wireless number. A ported number is a telephone number that originated in a first area (e.g., Chicago) but has been "ported" to a second area (e.g., Atlanta) by an individual who may have moved from the first area to the second area. In many instances, a ported number is associated with a mobile device 205. Numerous commercial databases or services are available to determine whether the telephone number is a mobile/wireless number or that it has been ported to a mobile device. If the answer is no (e.g., the number is neither a mobile/wireless number nor a ported number), then this tends to suggest the number is a wireline number and does not belong to a mobile device 205.

Thus, if the contact center module determines the retrieved number is not for a mobile device 205, then the contact center module processes the telephone number as it normally processes a retrieved telephone number in Operation 903. However, if the contact module instead determines the retrieved number is for a mobile device 205, then the contact center module determines whether authorization has been obtained from the targeted party associated with the retrieved telephone number to gather information from and/or to place a call to the targeted party's mobile device 205 in Operation 904. This is, for instance, whether the banking institution received permission from the customer for retrieving information from the customer's mobile device 205. For example, such permission may have been obtained at the time the customer downloaded the banking institution's software application to the customer's mobile device 205 and the customer registered the download and subsequently agreed to have information gathered from his device 205.

Depending on the embodiment, the contact center module may determine whether authorization has been obtained in a number of different ways. For instance, if the contact center 210 is performing the outbound campaign for a third party (e.g., the banking institution), then the contact center module may request authorization from the third party. This may involve the contact center module accessing a data store for the third party that stores the permission or the contact center module may send a request for authorization to the third party and the third party may respond that permission has been provided. While in another instance, the contact center 210 may internally store such information and the contact center module may query such information from an internal data store. Those of ordinary skill in the art can envision numerous ways the contact center module may determine whether authorization has been obtained from the targeted party in light of this disclosure.

Accordingly, if authorization has not been obtained from the targeted party, in particular embodiments, the contact center module processes the retrieved number as it normally would. However, if authorization has been obtained from the targeted party, then the contact center module requests information on the targeted party's mobile device 205 in Operation 905. As previously mentioned, depending on the embodiment, this request may be sent directly or indirectly to the targeted party's mobile device 205. For instance, in one embodiment, the contact center module sends the request to the targeted party's cellular carrier 220 and the carrier 220 obtains the requested information from the targeted party's mobile device 205 and returns the information to the contact center module. While in another embodiment, the contact center module may access the information in some type of data store 225 that is periodically updated with current information on the targeted party's mobile device 205.

In Operation 906, the contact center module receives the information on the targeted party's mobile device 205. Thus, returning to the example, the contact center module receives information from the banking institution's customer's device 205 that the current time on the device 205 is 1:30 p.m., the geo-location of the device 205 is Los Angeles, and the time zone the device 205 is currently located in is the Pacific Time Zone.

At this point, in particular embodiments, the contact center module may perform a lookup to obtain a time zone for the mobile device 205 based on one or more pieces of information returned to the contact center module in Operation 907. For instance, depending on the circumstances, the contact center module may use a current time retrieved from the mobile device 205, a geo-location retrieved from the mobile device 205, or both to perform a lookup to find the time zone associated with these pieces of information. Thus, for example, the contact center module may determine the time zone in which the mobile device 205 for the customer is located based on a current time of 1:30 p.m. and/or a geo-location of Los Angeles is the Pacific Time Zone. Likewise, in particular embodiments, the contact center module may determine the local time where the targeted party's mobile device 205 is located based on one or more pieces of information returned to the contact center module in Operation 908. Depending on the circumstances, the local time may be based on the current time, the geo-location, a time zone retrieved from the mobile device 205, or any combination thereof. Again, for example, the contact center module may determine the local time where the customer's mobile device 205 is located is 1:37 p.m. based on a current time of 1:30 p.m., a geo-location of Los Angeles, and/or a time zone of the Pacific Time Zone.

At this point, in particular embodiments, the contact center module compares the device information (e.g., both received and derived) to determine whether any discrepancies exist with respect to this information in Operation 909. This may ensure the information received by the contact center module is accurate and has not been corrupted. For instance, the contact center module may determine whether the current time provided from the targeted party's mobile device 205 matches the local time determined by the contact center module for the device 205. It should be understood that the term "matches" does not necessary mean the two values must be exactly the same to constitute a "match." Depending on the embodiment, a "match" may constitute a situation in which the two values are within a tolerance (e.g., threshold) from each other. For instance, returning to the example, the current time provided from the device 205 is 1:30 p.m. and the local time determined by the contact center module is 1:37 p.m. Depending on the tolerance, these two values may be considered to match. Likewise, in particular instances, the contact center module may determine whether the time zone provided by the device 205 matches the time zone determined by the contact center module.

It should be noted that, in particular embodiments, depending on the time that has lapsed between when the information was gathered from the targeted party's mobile device 205 and when the contact center module compares the device information may determine the level of tolerance afforded to determine whether a match exists between two pieces of information for the device 205. For instance, in the example, the information on the customer's mobile device 205 may have been gathered from the device 205 and stored for two hours prior to the contact center module requesting the information. Therefore, the current time for the device 205 may indicate 1:30 p.m. however the local time determined by the contact center module for the device 205 may be 3:37 p.m. Thus, in this instance, the contact center module may take into account this elapsed time between when the information for the device 205 was gathered and when the local time for the device 205 was determined in determining whether the two pieces of information match.

Thus, in Operation 910, the contact center module determines whether the information for the mobile device 205 agrees. That is, the contact center module determines whether any discrepancies do or do not exist with respect to the information for the mobile device 205. If the information agrees, then the contact center module queries the applicable calling window in Operation 911. As previously mentioned, the applicable calling window may be defined based on one or more regulations or may be defined by the customer who has identified preferences for being contacted. Therefore, depending on the circumstances, the contact center module may query the applicable calling widow from the information received for the mobile device 205 or from some other storage source such as a data store 475 within the contact center 210. Thus, the applicable calling window for the contact center to place a call to the banking institution's customer may have been identified in the customer preferences as 9:00 a.m. to 5:00 p.m. local time for the customer.

At this point, the contact center module determines whether the local time determined for the targeted party's mobile device 205 (and/or, in some instances, the current time received for the device 205) is within the calling window in Operation 912. Thus, in the example, the contact center module determines whether the local time of 1:37 p.m. and/or the current time of 1:30 p.m. are within the calling window of 9:00 a.m. to 5:00 p.m. In this instance, both times are within the calling window so the contact center module places the call to the customer's mobile device 205 in Operation 913. Accordingly, as a result of using information derived from the targeted party's mobile device 205, in various embodiments, the contact center 210 can ensure a call placed to the targeted party's device is in conformance with respect to the applicable calling window. At this point, the contact center mobile determines whether another dialing record exists for the contact list in Operation 914. If so, then the contact center module retrieves the next dialing record (e.g., the next telephone number) from the list and repeats the process.

Finally, it should be understood that although not indicated in FIG. 9, various operations shown in the process flow may be optional depending on the embodiment. For instance, if the outbound campaign involved sending text messages as opposed to placing telephone calls to the targeted parties, then the records found on the list of contacts may likely only contain telephone numbers for mobile devices since wireline devices do not typically have the capability to receive text messages. Therefore, in this instance, the contact center module may not be required to determine whether the telephone number retrieved from the list of contacts is a wireless number. While in some embodiments, the contact center module may not be required to determine whether the targeted party has provided permission to have information retrieved from his mobile device 205. Further, in some embodiments, the contact center module may not be required to perform one or more of the operations of looking up a time zone, determining a local time for the device 205, and comparing the device information to ensure that the information agrees. For example, in one embodiment, the information received on the mobile device 205 may be the current time on the device 205. Thus, for this particular embodiment, the contact center module may not be required to convert a geo-location to a time zone and/or calculate a local time for the mobile device 205. Rather, the contact center module may then skip to determining whether the current time received for this device 205 is within the applicable calling window. Therefore, the particular process flow (and associated operations) shown in FIG. 9 is of but one of the possible process flows for practicing the various technologies and concepts disclosed herein and one of ordinary skill in the art should understand that variations of this process flow exist.

Exemplary Mobile Device

Figure 10:
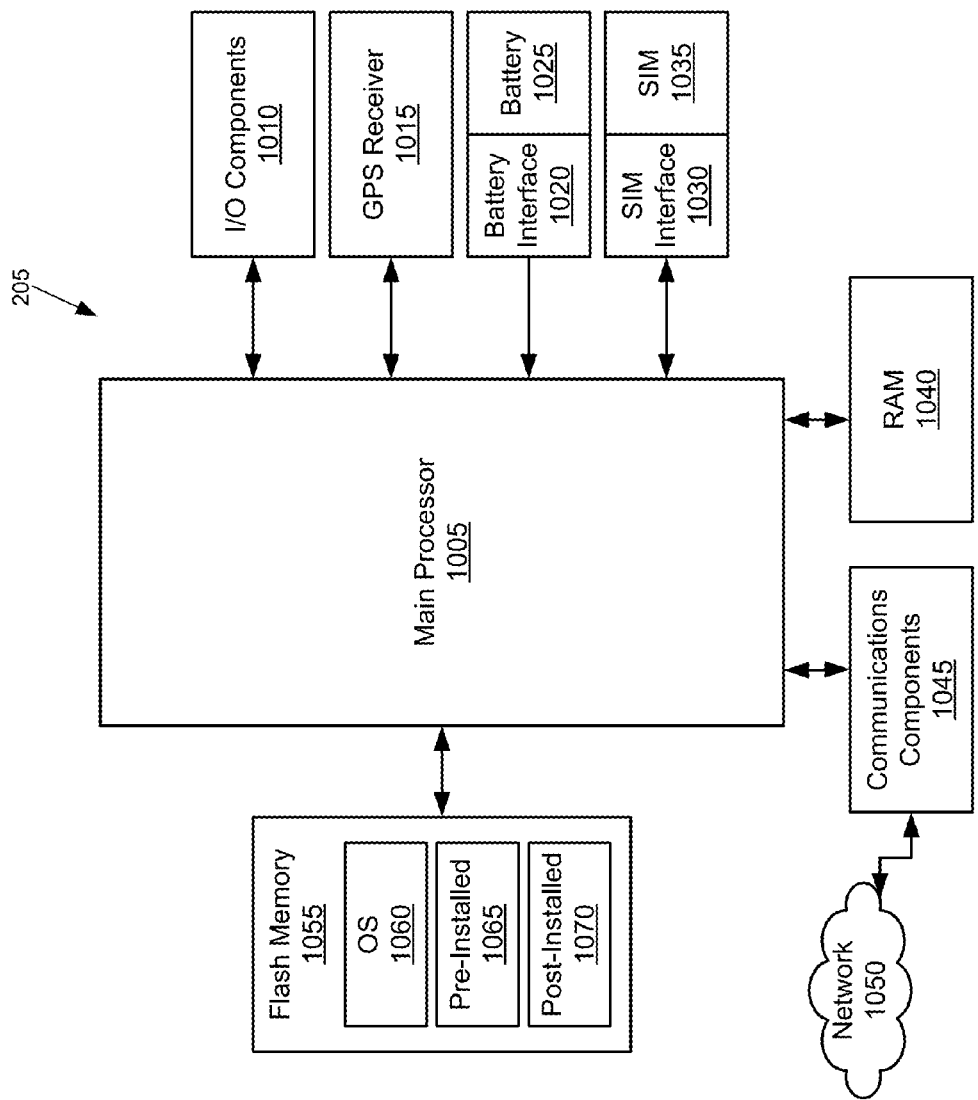
FIG. 10 illustrates an embodiment of a mobile device for practicing various technologies and concepts disclosed herein.

FIG. 10 is an exemplary schematic diagram of a mobile device 205 that may be used in various embodiments to practice the technologies disclosed herein. The embodiment of the mobile device 205 shown in FIG. 10 includes a main processor 1005 that controls the overall operations of the device 205. Communication functions are carried out by various communication components 1045 and these functions may relate to data and voice communications. For instance, the communication components 1045 may receive data communications such as text messages and/or email messages over some type of wireless network 1050 such as a carrier's cellular network or a Wi-Fi network. Likewise, the communication components 1045 may receive voice communications (e.g., telephone calls) over the wireless network 1050, typically the carrier's cellular network.

Typically, the mobile device 205 is configured to send and receive communications over the wireless network 1050 once the device 205 has been registered with the carrier. Thus, access for the device 205 is normally identified with a particular individual known to the carrier as a subscriber. To identify the subscriber, in particular embodiments, the mobile device 205 may use a component such as a Subscriber Identity Module (SIM) card 1035 and this card 1035 may be inserted into an interface 1030 so that the card 1035 may communicate with the network 1050. In other embodiments, the mobile device 205 may use some other type of identifier component such as a Removable User Identity Module (RUIM) or a Universal Subscriber Identity Module (USIM).

For the embodiment shown in FIG. 10, the main processor 1005 interacts with a Global Positioning System (GPS) receiver 1015 for the purpose of determining the mobile device's current location. In addition, the main processor 1005 interacts with one or more Input/Output (I/O) components 1010 such as a display, a keyboard, a speaker, and/or a microphone. For instance, the mobile device 205 may include a display and keyboard that is used for functionality such as entering text messages to send over the wireless network 1050 or to perform some other type of functionality such as scrolling through a contact list stored on the device 205 or using a calendar application available on the device 205. Further, for the embodiment shown in FIG. 10, the mobile device 205 is battery powered and includes a battery interface 1020 for receiving one or more batteries 1025 for providing power to the device 205.

Voice communications are typically received as signals outputted to a speaker and signals transmitted by a microphone. In particular instances, a display may also be used to provide additional information such as the identity of a caller, duration of a communication, or other communication related information. In addition, in some instances, the mobile device 205 may include touch-screen capabilities for the display that allows a user to enter data communications such as text messages and emails. Further, in some instances, the mobile device 205 may include one or more auxiliary I/O components 1010 such as a mouse, track ball, infrared capabilities, blue tooth capabilities, and/or dynamic button pressing capabilities.

The particular embodiment shown in FIG. 10 includes non-volatile memory such as flash memory 1055 in this instance. However, in other embodiments, the device 205 may include other types of persistent memory such as read-only memory (ROM). The flash memory 1055 stores operating system code 1060 for the mobile device 205 that is executed by the main processor 1005. In addition, the flash memory 1055 may store one or more pre-installed modules 1065 and/or one or more post-installed modules 1070. Further, depending on the embodiment, portions of the operating system code 1060, pre-installed modules 1065, and/or post-installed modules 1070 may be temporarily loaded and stored in volatile memory such as random-access memory (RAM) 1040.

The pre-installed modules 1065 include modules that are typically installed on the mobile device 205 during manufacturing. For instance, the manufacturer of the device 205 may install a message module that allows the user of the device 205 to send and receive text messages that are typically stored in the flash memory 1055. In addition, the manufacturer may install a personal information manager (PIM) module for managing and organizing e-mail, text messages, contacts, calendar events, voice mails, etc.

In contrast, post-installed modules 1070 are typically modules that are added to the mobile device 205 after the device 205 has left the manufacturer. In many instances, these modules are third-party software applications that are downloaded to the mobile device 205 and such applications may be configured to perform a number of different functionality. For instance, a third-party software application that may be downloaded to the mobile device is the banking software application as previously discussed. Depending on the circumstances, a post-installed module 1070 may be downloaded to the device 205 over the wireless network 1050 or via an auxiliary I/O component 1010 such as a data port (e.g., USB port) that may be used to plug the device 205 into a data source such as the user's home personal computer.

Exemplary Computer Processing Device

Figure 11:
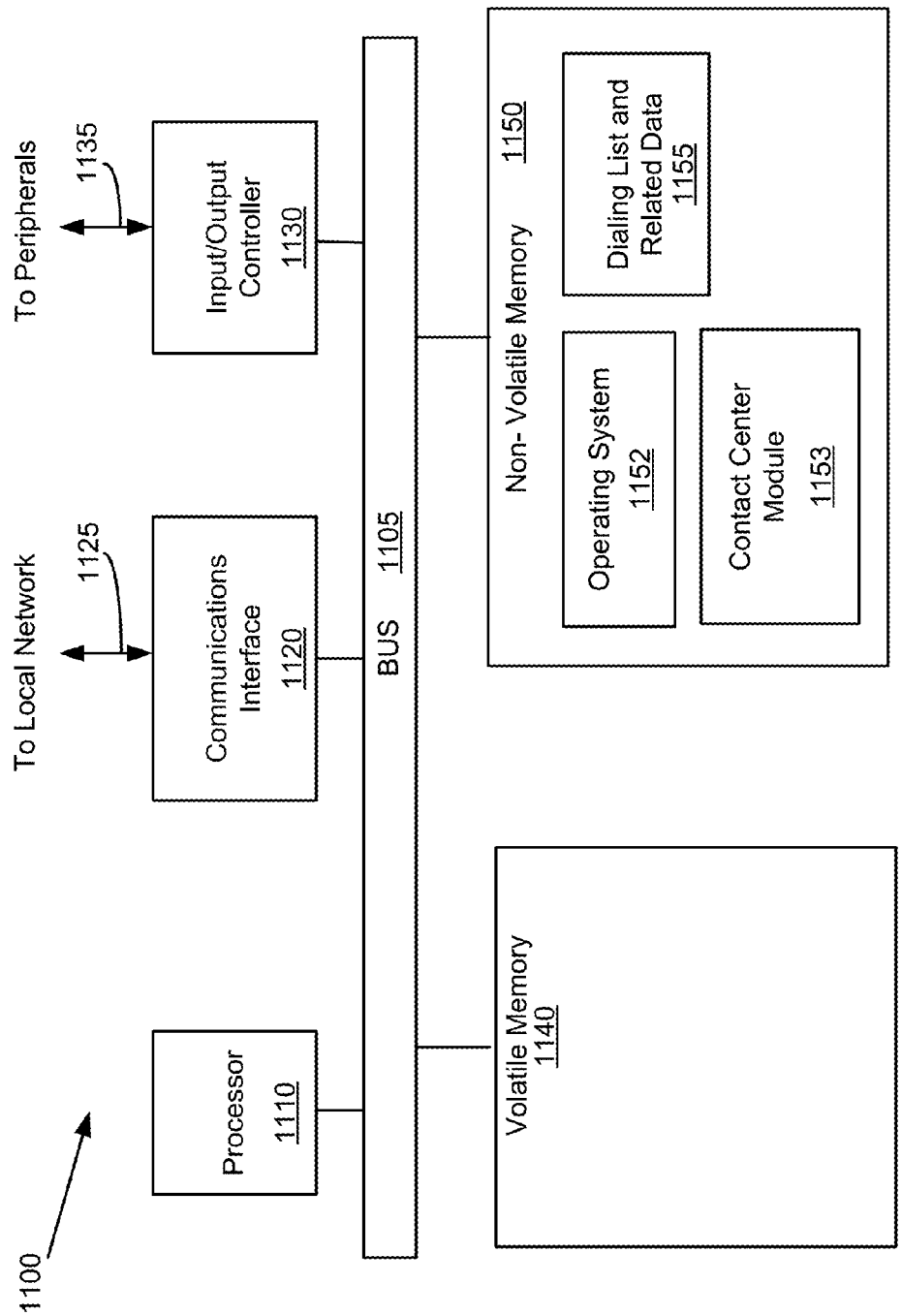
FIG. 11 illustrates an embodiment of a processing device for practicing various technologies and concepts disclosed herein.

FIG. 11 is an exemplary schematic diagram of a computer processing system that may be used in embodiments of various architectures, such as the contact center architecture 400, to practice the technologies disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 11, the processing system 1100 may include one or more processors 1110 that may communicate with other elements within the processing system 1100 via a bus 1105. The processor 1110 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 1100 may also include one or more communications interfaces 1120 for communicating data via a network 470 with various external devices. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 1130 may also communicate with one or more input devices or peripherals using an interface 1135, such as, but not limited to: a keyboard, a mouse, a touch screen/display input, microphone, pointing device, etc. The input/output controller 1130 may also communicate with output devices or peripherals, such as displays, printers, speakers, headsets, banner displays, etc. These may be used, in part, to receive Administrator input, including for interacting with the manual agent selection module.

The processor 1110 may be configured to execute instructions stored in volatile memory 1140, non-volatile memory 1150, or other forms of computer readable storage media accessible to the processor 1110. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1150 may store program code and data, which also may be loaded into the volatile memory 1140 at execution time. For example, for a computer processing system of a contact center 210, the non-volatile memory 1150 may store one or more contact center module 1153 that may perform the above mentioned process flows and/or operating system code 1152 containing instructions for performing the process and/or functions associated with the technologies disclosed herein. The module 1153 may also access, generate, or store related data 1155, including, for example, the data described above in conjunction with a targeted party's mobile device 205, in the non-volatile memory 1150, as well as in the volatile memory 1140. In other embodiments, calling window tables may also be stored here. The volatile memory 1140 and/or non-volatile memory 1150 may be used to store other information including, but not limited to: records, applications, programs, scripts, source code, object code, byte code, compiled code, interpreted code, machine code, executable instructions, or the like. These may be executed or processed by, for example, the processor 1110 and may form a part of, or may interact with, the module 1153.

The technologies described herein may be implemented in various ways, including as computer program products comprising memory storing instructions causing a processor to perform the operations associated with the above technologies. The computer program product may comprise a non-transitory (tangible) computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory, propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for determining whether a local time for a party is within a calling window of time for originating a communication to a mobile device of the party, the method comprising the steps of:
   obtaining permission from the party to originate the communication to the mobile device of the party, wherein the permission is obtained as a result of the party successfully downloading a computer-program application to reside on the mobile device;
   after successfully obtaining the permission, obtaining information from the mobile device, the information being retrieved from the mobile device by the computer-program application and comprising at least one of a current time for a location where the mobile device is located, a geo-location of the mobile device, and a time zone for the location where the mobile device is located;
   deriving the local time based at least in part on the information;
   determining whether the local time for the party is within the calling window of time for originating the communication to the mobile device of the party; and
   originating the communication to the mobile device of the party in response to the local time for the party being within the calling window of time.

2. The method of claim 1 further comprising the step of sending a request to the computer-program application residing on the mobile device to obtain the information.

3. The method of claim 1 further comprising the step of providing the computer-program application for download to the mobile device of the party.

4. The method of claim 1 further comprising the step of obtaining permission from the party to retrieve the information about the mobile device of the party, wherein the permission to retrieve the information is obtained as the result of the party successfully downloading the computer-program application to reside on the mobile device.

5. The method of claim 1 wherein the information obtained from the mobile device comprises the current time for the location where the mobile device is located and the geo-location of the mobile device, and the method further comprises the steps of:
   deriving the local time from the geo-location of the mobile device;
   comparing the local time with the current time for the location where the mobile device is located; and
   originating the communication to the mobile device of the party in response to the local time being within the calling window of time and the local time and the current time being within a tolerance of each other.

6. The method of claim 1, wherein the communication comprises a text message.

7. A non-transitory, computer-readable medium comprising computer-executable instructions for determining whether a local time for a party is within a calling window of time for originating a communication to a mobile device of the party, the computer-executable instructions being configured to cause at least one computer processor to:
after successfully obtaining permission from the party to originate the communication to the mobile device, obtain information from the mobile device, the information being retrieved from the mobile device by a computer-program application residing on the mobile device and comprising at least one of a current time for a location where the mobile device is located, a geo-location of the mobile device, and a time zone for the location where the mobile device is located;
derive the local time based at least in part on the information;
determine whether the local time for the party is within the calling window of time for originating the communication to the mobile device of the party; and
have the communication originated to the mobile device of the party in response to the local time for the party being within the calling window of time, wherein the permission from the party to originate the communication to the mobile device is obtained as a result of the party successfully downloading the computer-program application to the mobile device.

8. The non-transitory, computer-readable medium of claim 7, wherein the computer-executable instructions are further configured to cause the at least one computer processor to send a request to the computer-program application residing on the mobile device to obtain the information.

9. The non-transitory, computer-readable medium of claim 7, wherein permission from the party to retrieve the information about the mobile device of the party is also obtained as a result of the party successfully downloading the computer-program application to reside on the mobile device.

10. The non-transitory, computer-readable medium of claim 7, wherein the information obtained from the mobile device comprises the current time for the location where the mobile device is located and at least one of the geo-location of the mobile device and the time zone for the location where the mobile device is located, and the computer-executable instructions are further configured to cause the at least one computer processor to:
derive the local time from at least one of the geo-location of the mobile device and the time zone for the location where the mobile device is located;
compare the local time with the current time for the location where the mobile device is located; and
have the communication originated to the mobile device of the party in response to the local time being within the calling window of time and the local time and the current time being within a tolerance of each other.

11. The non-transitory, computer-readable medium of claim 7, wherein the computer-executable instructions are further configured to cause the at least one computer processor to:
retrieve a telephone number from a list of contacts; and
determine whether the telephone number is for the mobile device, wherein the computer-executable instructions are configured to cause the at least one computer processor to obtain the information from the mobile device in response to determining the telephone number is for the mobile device.

12. The non-transitory, computer-readable medium of claim 7, wherein the communication comprises a text message.

13. A system for determining whether a local time for a party is within a calling window of time for originating a communication to a mobile device of the party, the system comprising:
at least one computer processor configured to:
after successfully obtaining permission from the party to originate the communication to the mobile device, obtain information from the mobile device, the information being retrieved from the mobile device by a computer-program application residing on the mobile device and comprising at least one of a current time for a location where the mobile device is located, a geo-location of the mobile device, and a time zone for the location where the mobile device is located;
derive the local time based at least in part on the information;
determine whether the local time for the party is within the calling window of time for originating the communication to the mobile device of the party; and
have the communication originated to the mobile device of the party in response to the local time for the party being within the calling window of time, wherein the permission from the party to originate the communication to the mobile device is obtained as a result of the party successfully downloading the computer-program application to the mobile device.

14. The system of claim 13, wherein the at least one computer processor is further configured to send a request to the computer-program application residing on the mobile device to obtain the information.

15. The system of claim 13, wherein permission from the party to retrieve the information about the mobile device of the party is also obtained as a result of the party successfully downloading the computer-program application to reside on the mobile device.

16. The system of claim 13, wherein the information obtained from the mobile device comprises the current time for the location where the mobile device is located and at least one of the geo-location of the mobile device and the time zone for the location where the mobile device is located, and the at least one computer processor is further configured to:
derive the local time from at least one of the geo-location of the mobile device and the time zone for the location where the mobile device is located;
compare the local time with the current time for the location where the mobile device is located; and
originate the communication to the mobile device of the party in response to the local time being within the calling window of time and the local time and the current time being within a tolerance of each other.

17. The system of claim 13, wherein the at least one computer processor is further configured to:
retrieve a telephone number from a list of contacts; and
determine whether the telephone number is for the mobile device, wherein the at least one computer processor obtains the information from the mobile device in response to determining the telephone number is for the mobile device.

18. The system of claim 13, wherein the communication comprises a text message.

* * * * *